United States Patent
Xiao

(10) Patent No.: US 12,159,025 B2
(45) Date of Patent: Dec. 3, 2024

(54) POSITION MARKING METHOD, APPARATUS, AND DEVICE IN VIRTUAL SCENE, STORAGE MEDIUM, AND PROGRAM PRODUCT

(71) Applicant: Tencent Technology (Shenzhen) Company Limited, Guangdong (CN)

(72) Inventor: Jie Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/348,859

(22) Filed: Jul. 7, 2023

(65) Prior Publication Data

US 2023/0350554 A1 Nov. 2, 2023

Related U.S. Application Data

(63) Continuation of application No. PCT/CN2022/130823, filed on Nov. 9, 2022.

(30) Foreign Application Priority Data

Feb. 25, 2022 (CN) .......................... 202210179779.2

(51) Int. Cl.
*G06F 3/0482* (2013.01)
*G06F 3/04845* (2022.01)

(52) U.S. Cl.
CPC ........ *G06F 3/04845* (2013.01); *G06F 3/0482* (2013.01)

(58) Field of Classification Search
CPC .......................... G06F 3/04845; G06F 3/0482
See application file for complete search history.

(56) References Cited

U.S. PATENT DOCUMENTS

| | | | |
|---|---|---|---|
| 6,690,402 B1* | 2/2004 | Waller | G06F 3/011 |
| | | | 715/848 |
| 9,250,730 B2* | 2/2016 | Au | G06F 3/0482 |
| 9,886,794 B2* | 2/2018 | van Os | G06F 3/04845 |
| 10,642,698 B1* | 5/2020 | Chopra | G06F 9/5077 |

(Continued)

FOREIGN PATENT DOCUMENTS

| CN | 110738738 A | 1/2020 |
|---|---|---|
| CN | 111352696 A | 6/2020 |

(Continued)

OTHER PUBLICATIONS

International Search Report of PCT/CN2022/130823 dated Feb. 8, 2023 [PCT/ISA/210].

(Continued)

*Primary Examiner* — Anil K Bhargava
(74) *Attorney, Agent, or Firm* — Sughrue Mion, PLLC

(57) ABSTRACT

A method, apparatus and device including: displaying a map of the virtual scene; displaying at least one marker based on a position marking instruction for a virtual resource in the virtual scene; controlling the target marker to move in the map with the execution of a dragging operation based on the dragging operation for the target marker in at least one marker; and marking the target marker at a current position of the target marker in the map based on a release instruction for the dragging operation.

18 Claims, 13 Drawing Sheets

(56) References Cited

U.S. PATENT DOCUMENTS

| | | | | |
|---|---|---|---|---|
| 10,902,522 | B1* | 1/2021 | Kreisel | H04L 67/53 |
| 11,727,641 | B2* | 8/2023 | Moore | G01C 21/3881 |
| | | | | 715/810 |
| 11,829,592 | B2* | 11/2023 | Unnikrishnan | G06F 3/04815 |
| 2011/0007094 | A1* | 1/2011 | Nash | G06F 3/04842 |
| | | | | 382/282 |
| 2011/0131525 | A1* | 6/2011 | Majumder | G06F 30/39 |
| | | | | 715/802 |
| 2012/0259669 | A1* | 10/2012 | Stilwell | G06Q 10/02 |
| | | | | 705/5 |
| 2012/0324378 | A1* | 12/2012 | Stambaugh | G06T 15/005 |
| | | | | 715/764 |
| 2014/0301666 | A1* | 10/2014 | Thota | G06F 16/587 |
| | | | | 382/305 |
| 2015/0245168 | A1* | 8/2015 | Martin | H04W 4/029 |
| | | | | 715/751 |
| 2019/0163687 | A1* | 5/2019 | Edecker | G06F 16/285 |
| 2021/0278897 | A1* | 9/2021 | Oliver | G06F 3/013 |
| 2021/0390153 | A1* | 12/2021 | Lewis | H04L 67/52 |
| 2022/0201163 | A1* | 6/2022 | Ukas-Bradley | H04N 5/272 |
| 2024/0053876 | A1* | 2/2024 | Unnikrishnan | G01C 21/3664 |

FOREIGN PATENT DOCUMENTS

| | | |
|---|---|---|
| CN | 111506323 A | 8/2020 |
| CN | 112711458 A | 4/2021 |
| CN | 113171605 A | 7/2021 |
| CN | 113546422 A | 10/2021 |
| CN | 113573089 A | 10/2021 |

OTHER PUBLICATIONS

Written Opinion of PCT/CN2022/130823 dated Feb. 8, 2023 [PCT/ISA/237].

* cited by examiner

POSITION MARKING METHOD, APPARATUS, AND DEVICE IN VIRTUAL SCENE, STORAGE MEDIUM, AND PROGRAM PRODUCT

RELATED APPLICATION

This application is a continuation application of International Patent Application No. PCT/CN2022/130823 filed on Nov. 9, 2022, which claims priority to Chinese Patent Application No. 202210179779.2 filed on Feb. 25, 2022, which are incorporated by reference in their entireties.

FIELD

The disclosure relates to the field of virtualization and human-computer interaction technologies, and in particular, to a position marking method, apparatus and device in a virtual scene, a storage medium, and a program product.

BACKGROUND

As there are more and more open-world themed games, players usually perform various kinds of game tasks recommended by a system in a big world. There are a lot of kinds of tasks in the game, and each task is different in interaction scenes and non-player characters. When the player checks the scene of the task, it is necessary for the user to open a map by a map function in the game, find a corresponding task icon on the map, navigate automatically or set a mark point, and then follow instructions in the game to go to a task point.

In related technologies, if the user wants to mark a certain position on the map, the user needs to click for multiple times, and in a case of repeating the marking, the user needs to repeat the click operations more times, so that the human-computer interaction is frequent, and the marking efficiency is low.

SUMMARY

Some embodiments of the disclosure provide a position marking method and apparatus in a virtual scene, an electronic device, a computer-readable storage medium, and a computer program product, which can realize quick marking of a virtual resource icon, reduce the number of human-computer interactions, and improve the control efficiency of the virtual scene.

Technical schemes in some embodiments of the disclosure are implemented as follows:

Some embodiments of the disclosure provide a position marking method in a virtual scene, including:
  displaying a map of the virtual scene;
  displaying at least one virtual resource icon based on a position marking instruction for a virtual resource in the virtual scene;
  controlling the target virtual resource icon to move in the map with the execution of a dragging operation based on the dragging operation for the target virtual resource icon in at least one virtual resource icon; and
  marking the target virtual resource icon at a current position of the target virtual resource icon in the map based on a release instruction for the dragging operation.

Some embodiments of the disclosure provide a position marking apparatus in a virtual scene, which includes:
  a display module, configured to display a map of the virtual scene in an interface of the virtual scene,
  the display module being further configured to display at least one virtual resource icon based on a position marking instruction for a virtual resource in the virtual scene;
  a control module, configured to control the target virtual resource icon to move in the map with the execution of a dragging operation based on the dragging operation for the target virtual resource icon in at least one virtual resource icon; and
  a marking module, configured to mark the target virtual resource icon at a current position of the target virtual resource icon in the map based on a release instruction for the dragging operation.

Some embodiments of the disclosure provide an electronic device, including:
  a memory, configured to store an executable instruction; and
  a processor, configured to implement the position marking method in the virtual scene according to some embodiments of the disclosure when executing the executable instruction stored in the memory.

Some embodiments of the disclosure provide a computer-readable storage medium, storing an executable instruction, and configured to cause a processor, when executing the executable instructions, to implement the position marking method in the virtual scene according to some embodiments of the disclosure.

Some embodiments of the disclosure provide a computer program product, including a computer program or an instruction, the computer program or instruction, when executed by a processor, implementing the position marking method in the virtual scene according to some embodiments of the disclosure.

Some embodiments of the disclosure have the following beneficial effects:

By using some embodiments of the disclosure, the target virtual resource icon is controlled to move in the map through the dragging operation for the target virtual resource icon displayed in the virtual scene, and after the release instruction for the dragging operation is received, the marking process for the target virtual resource icon is completed, so that the virtual resource icon can be quickly and accurately marked in a dragging way without changing the map scale and position. Compared with the way of marking by clicking the position on the map to trigger the marking pop-up window in related technologies, the number of human-computer interactions is reduced, the marking efficiency for the virtual resource icon in the map is improved, the touch by mistake is avoided, and the control efficiency of the virtual scene is improved.

DESCRIPTION OF EMBODIMENTS

Figure 1:
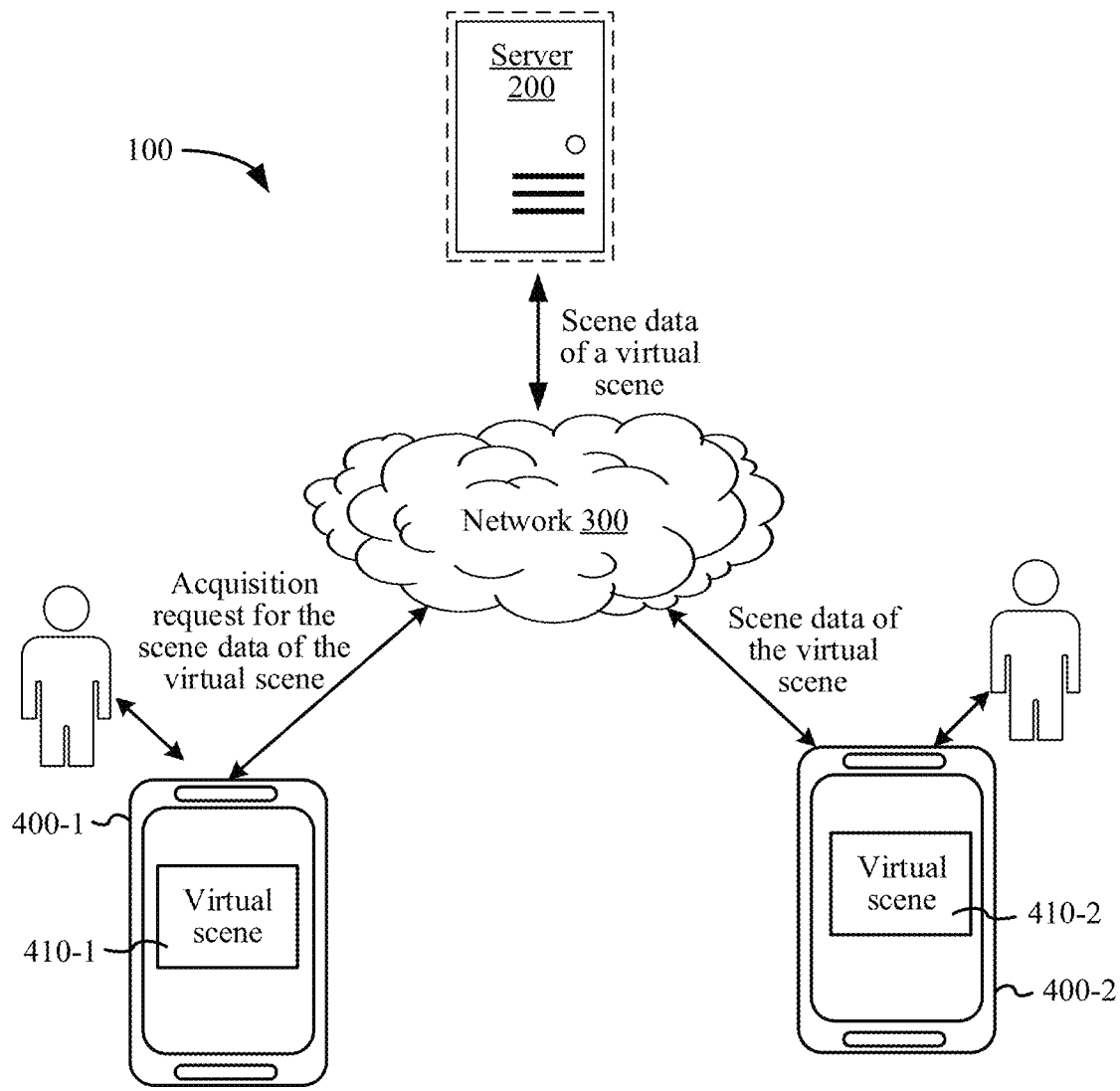
FIG. 1 is a schematic architectural diagram of a position marking system in a virtual scene according to some embodiments.

Certain embodiments are described in detail below with reference to the drawings. The described embodiments are not to be construed as a limitation to the present disclosure.

In the following descriptions, some related embodiments describe a subset of all possible embodiments. However, it may be understood that the some embodiments may be the same subset or different subsets of all the possible embodiments, and may be combined with each other without conflict.

"Plurality of", as mentioned in the specification means two or more. "And/or" describes an association relationship for describing associated objects and represents that three relationships may exist. For example, A/B may represent the following cases: Only A exists, both A and B exist, and only B exists. Similarly, the phrase "at least one of A and B" includes within its scope "only A", "only B" and "A and B". The character "/" in this specification generally indicates an "or" relationship between the associated objects unless otherwise noted or the context suggests otherwise.

The following description is added for similar description of "first/second" in this application. In the following description, the terms "first/second/third" are merely intended to distinguish between similar objects rather than describing specific orders. It may be understood that, "first/second/third" is interchangeable in proper circumstances to enable some embodiments of this application to be implemented in other orders than those illustrated or described herein.

Unless otherwise defined, meanings of all technical and scientific terms used in this specification are the same as those usually understood by a person skilled in the art to which this application belongs. Terms used in the specification of this application are merely intended to describe objectives of the specific embodiments, but are not intended to limit this application.

Before some embodiments of this application are further described in detail, a description is made on nouns and terms in some embodiments of this application, and the nouns and terms in some embodiments of this application are applicable to the following explanations.

1) Client: it refers to application programs run in a terminal and used for providing various services, such as an instant communication client, and a video playback client.

2) Based on: indicates a condition or a state on which an executed operation depends, in a case that the depended condition or state is satisfied, the one or more executed operations may be real-time, or may have a set delay; and unless otherwise specified, there is no restriction on the execution sequence of multiple operations.

3) Virtual scene: the virtual scene is displayed (provided) during the running of an application program on a terminal. The virtual scene may be a simulation environment for the real world, a semi-simulation and semi-fiction virtual environment, or a purely fictional virtual environment. The virtual scene may be any of a two-dimensional virtual scene, a 2.5-dimensional virtual scene, or a three-dimensional virtual scene. The dimension of the virtual scene is not limited by some embodiments of this application. For example, the virtual scene may include sky, land, ocean, and the like. The land may include desert, city, and other environmental elements, and users may control virtual objects to perform activities in the virtual scene. The activities include, but are not limited to: any of adjustment of body posture, creeping, walking, running, riding, jumping, driving, picking, shooting, attacking, and throwing. The virtual scene may be a virtual scene displayed from a first-person perspective (for example, playing a virtual object in a game from the perspective of a player); the virtual scene may also be a virtual scene displayed from a third-person perspective (for example, the player chases the virtual object in the game to play the game); the virtual scene may also be a virtual scene displayed in a bird-eye view; and the above views may be switched arbitrarily.

By taking the virtual scene displayed from the first-person perspective as an example, the virtual scene displayed in the human-computer interaction interface may include: a view area of a virtual object is determined according to a viewing position and a field angle of the virtual object in the complete virtual scene, a part of the virtual scene located in the view area in the complete virtual scene is shown, that is, the displayed virtual scene may be a part of the virtual scene of the panoramic virtual scene. Because the first-person perspective is a viewing angle that can give the user the most impact, the immersive perception of the user during the operation can be realized. By taking the virtual scene displayed from the bird-eye view as an example, the interface of the virtual scene shown in a human-computer interaction interface may include: based on a zooming operation for the panoramic virtual scene, a part of the virtual scene corresponding to the zooming operation is shown in the human-computer interaction interface, that is, the displayed virtual scene may be a part of the virtual scene relative to the panoramic virtual scene. Thus, the operability of users in an operation process can be improved, so that the efficiency of the human-computer interaction can be improved.

4) Scene data indicates various features expressed by the object in the virtual scene in an interaction process, for example, may include a position of the object in the virtual scene. Of course, the scene data may include different types of features according to the type of the virtual scene. For example, in the virtual scene of games, the scene data may include waiting time for configuring various functions in the virtual scene (depending on the number of using the same function in a specific time), may also indicate an attribute value of various states of game characters, for example, including a hit point (also referred to as a health point), a magic value (also referred to as a magic point), a state value, a health point, etc.

5) Open-world game is also referred to as a free-roam game, which is a kind of game level design, and in the open-world game, the player may roam freely in a virtual world, and may freely select a time point and way for completing the game task.

Based on the above explanation of the terms involved in some embodiments of this application, the position marking system in the virtual scene provided in some embodiments of this application is described below. Referring to FIG. 1, FIG. 1 is a schematic architectural diagram of a position marking system in a virtual scene according to some embodiments of this application. In order to support an exemplary application, a terminal (a terminal 400-1 and a terminal 400-2 are exemplarily shown) is connected with a server 200 through a network 300, and the network 300 may be a wide area network or a local area network, or a combination of the two, which realizes the data transmission by using a wireless or wired link.

The terminal (such as the terminal 400-1 and the terminal 400-2) is configured to transmit an acquisition request for scene data of the virtual scene to the server 200 based on a trigger operation of entering the virtual scene received by a view interface.

The server 200 is configured to receive the acquisition request for the scene data, and returns the scene data of the virtual scene to the terminal based on the acquisition request.

The terminal (such as the terminal 400-1 and the terminal 400-2) is configured to receive the scene data of the virtual scene, renderer a picture of the virtual scene based on the obtained scene data, and show the picture of the virtual scene at a graphic interface (a graphic interface 410-1 and a graphic interface 410-2 are exemplarily shown). Corresponding map information is shown in the picture of the virtual scene, and the contents shown in the picture of the virtual scene are all rendered based on the returned scene data of the virtual scene.

The terminal (such as the terminal 400-1 and the terminal 400-2) is also configured to display the map of the virtual scene; display at least one virtual resource icon based on a position marking instruction for a virtual resource in the virtual scene; control the target virtual resource icon to move in the map with the execution of a dragging operation based on the dragging operation for the target virtual resource icon in the at least one virtual resource icon; and mark the target virtual resource icon at a current position of the target virtual resource icon in the map based on a release instruction for the dragging operation. Thus, any position on a whole open-world map can be marked only by the dragging operation for the target virtual resource icon.

In some embodiments, some embodiments of this application may be implemented by the cloud technology. The cloud technology is a kind of hosting technology that unifies a series of resources such as hardware, software, and network in the wide area network or the local area network to realize the calculation, storage, processing, and sharing of data. The cloud technology is a general term of network technology, information technology, integration technology, management platform technology, and application technology based on cloud computing business modes, which may form a resource pool and be used on demand, and is flexible and convenient. The cloud computing technology may become an important support. Background services of the technical network system may need a large amount of computing and storage resources; and for example, in a case that the virtual scene is a game scene, the corresponding game is a cloud game, and the picture of the virtual scene displayed on the terminal is rendered by the server.

In practical application, the server 200 may be an independent physical server, or a server cluster or distributive system composed of a plurality of physical servers, or a cloud server providing cloud services, cloud databases, cloud computation, cloud functions, cloud storage, network services, cloud communication, middle-ware services, domain name services, security services, content delivery network (CDN), and basic cloud computing services such as big data, artificial intelligent platforms and the like. The terminal (such as the terminal 400-1 and the terminal 400-2) may be a smart phone, a tablet computer, a notebook computer, a desktop computer, a smart speaker, a smart TV, a smart watch, or the like, but is not limited thereto. The terminal (such as the terminal 400-1 and the terminal 400-2) and the server 200 may be connected directly or indirectly through a wired or wireless communication way, which is not limited in some embodiments of this application.

In practical application, the terminal (including the terminal 400-1 and the terminal 400-2) is equipped and run with an application program supporting the virtual scene. The application program may be any of a first-person shooting game (FPS), a third-person shooting game, a driving-type game taking a steering operation as a leading action, a multiplayer online battle arena games (MOBA), a two dimension (2D) game application, a three dimension (3D) game application, a virtual-reality application program, a three-dimension map program, or a multi-person survival game. The application program may also be an application program of a single version, such as a 3D game program of the single version.

Using a video game scene as an example, the user may perform an operation on a terminal in advance. After the terminal detects the operation of the user, a game configuration file of a video game may be downloaded, and the game configuration file may include an application program, interface display data, virtual scene data, or the like of the video game, so that the user may invoke the game configuration file while logging in to the video game on the terminal, to render and display an interface of the video game. The user may perform a touch operation on the terminal, and after detecting the touch operation, the terminal may determine game data corresponding to the touch operation and render and display the game data. The game data may include virtual scene data, behavioral data of a virtual object in the virtual scene, and the like.

Figure 2:
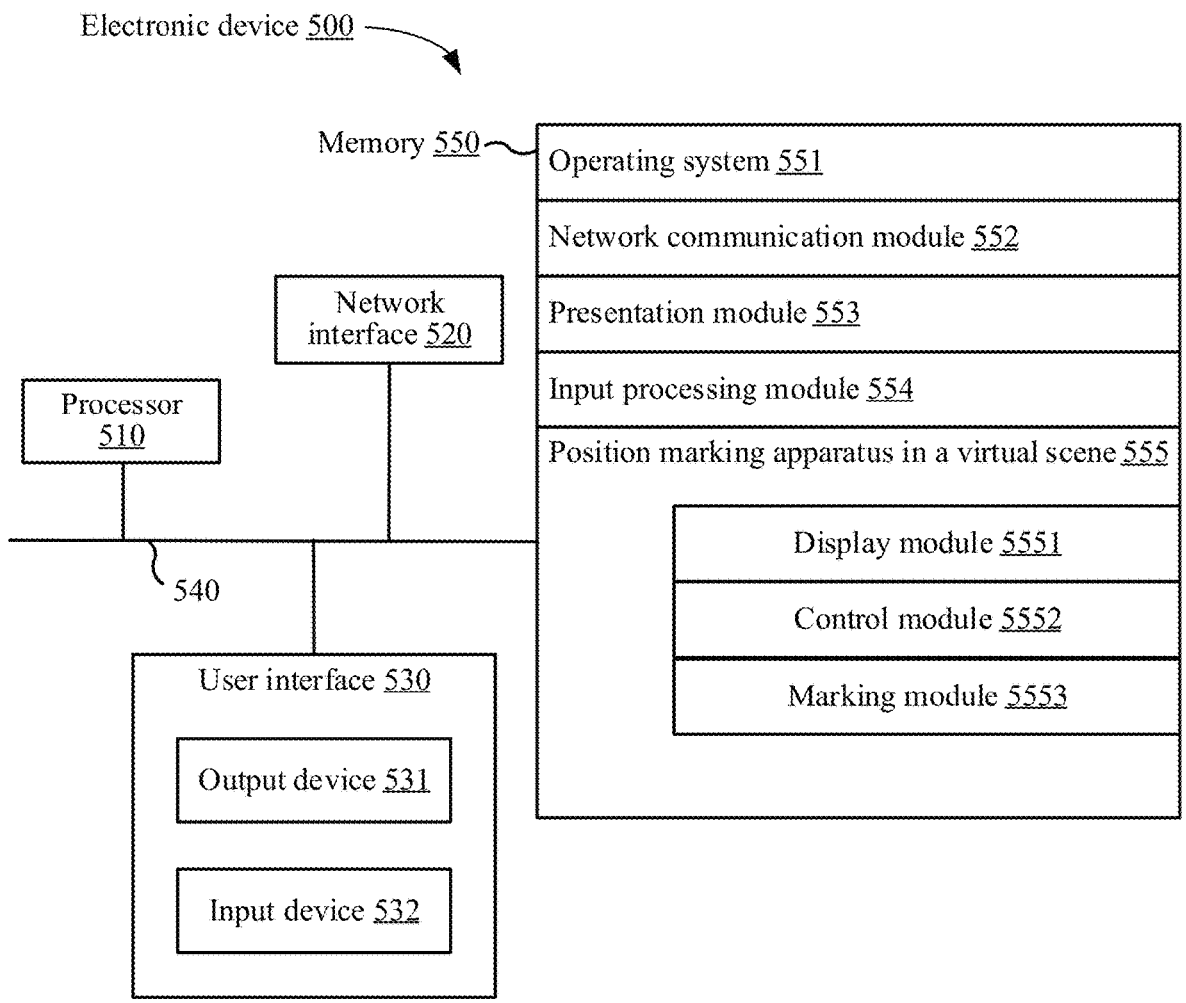
FIG. 2 is a schematic structural diagram of an electronic device implementing a position marking method in a virtual scene according to some embodiments.

Referring to FIG. 2, FIG. 2 is a schematic structural diagram of an electronic device implementing a position marking method in a virtual scene according to some embodiments of this application. In practical application, an electronic device 500 may be the server or terminal shown in FIG. 1. By taking the electronic device 500 that is the terminal shown in FIG. 1 as an example, the electronic device implementing the position marking method in the virtual scene according to the embodiment of this application is described. The electronic device 500 provided in some embodiments of this application includes: at least one processor 510, a memory 550, at least one network interface 520, and a user interface 530. Components in the electronic device 500 are coupled together by using a bus system 540. It may be understood that, the bus system 540 is configured to implement connection and communication between the components. In addition to a data bus, the bus system 540 further includes a power bus, a control bus, and a state signal bus. However, for ease of clear description, all types of buses in FIG. 2 are marked as the bus system 540.

The processor 510 may be an integrated circuit chip with signal processing capacity such as a general processor, a digital signal processor (DSP), another programmable logic device, discrete gate or transistor logic device, or discrete hardware assembly, or the like. The general processor may be a microprocessor or any conventional processor, and the like.

The user interface 530 includes one or more output devices 531 that can show the medium content, including one or more speakers and/or one or more visual display screens. The user interface 530 further includes one or more input devices 532, including a user interface component facilitating the input of the user, such as a keyboard, a mouse, a microphone, a touch display screen, a camera, another input button, and a control.

The memory 550 may be removable, irremovable or a combination thereof. The exemplary hardware device includes a solid memory, a hard disk drive, an optical disk drive, and the like. The memory 550 in some embodiments includes one or more storage devices that are physically away from the processor 510.

The memory 550 includes a volatile memory or a non-volatile memory, or may include both the volatile memory and the non-volatile memory. The non-volatile memory may be a read only memory (ROM), and the volatile memory may be a random access memory (RAM). The memory 550 described in the embodiment of this application aims at including any other suitable type of memories.

In some embodiments, the memory 550 can store data to support various operations. An example of these data includes a program, a module, and a data structure or a subset or a superset, which may be exemplarily described below.

An operating system 551 includes system programs for processing various basic system services and executing tasks based on hardware, such as a frame layer, a core library layer, a drive layer, and the like.

A network communication module 552 is configured to reach other computing devices via one or more (wired or wireless) network interfaces 520. The exemplary network interface 520 includes: Bluetooth, a wireless fidelity (WiFi), universal serial bus (USB), and the like.

A presentation module 553 is configured to present information (such as a user interface for operating a peripheral device and displaying the content and information) via one or more output devices 531 (such as a display screen, a loudspeaker, etc.) associated with the user interface 530.

An input processing module 554 is configured to detect one or more user inputs or interactions from one or more input devices 532, and translate the detected inputs or interactions.

In some embodiments, the position marking apparatus in the virtual scene provided in some embodiments of this application may be implemented by software. FIG. 2 shows the position marking apparatus 555 in the virtual scene stored in the memory 550, which may be software in a form of programs, plug-ins, and the like, including the following software modules: a display module 5551, a control module 5552, and a marking module 5553. These modules are logic modules, which may be arbitrarily combined or disassembled according to to-be-implemented functions. The functions of each module may be described below.

In some other embodiments, the position marking apparatus in the virtual scene provided in some embodiments of this application may be implemented by the combination of software and hardware. As an example, the position marking apparatus in the virtual scene provided in some embodiments of this application may be a processor adopting a form of hardware decoding processor, which is programmed to implement the position marking method in the virtual scene provided in some embodiments of this application. For example, the processor in the form of hardware decoding processor may adopt one or more application-specific integrated circuits (ASIC), a DSP, a programmable logic device (PLD), a complex programmable logic device (CPLD), a field programmable gate array (FPGA), or other electronic elements.

Based on the above explanation of the position marking system and electronic device in the virtual scene provided in some embodiments of this application, the position marking method in the virtual scene provided in some embodiments of this application is described below. In some embodiments, the position marking method in the virtual scene provided in some embodiments of this application may be implemented independently by a server or a terminal, or implemented collaboratively by the server and the terminal. In some embodiments, the terminal or the server may run a computer program to implement the position marking method in the virtual scene provided by some embodiments of this application. For example, the computer program may be a native program or software module in an operating system; a native application (APP), i.e., the program that can be run only being installed in the operating system, such as a client supporting the virtual scene, such as a game APP; a mini program, i.e., the program that may be run only after being downloaded into a browser environment; or mini programs that can be embedded in any APP. In general, the computer program may be any form of applications, modules, or plug-ins.

Figure 3:
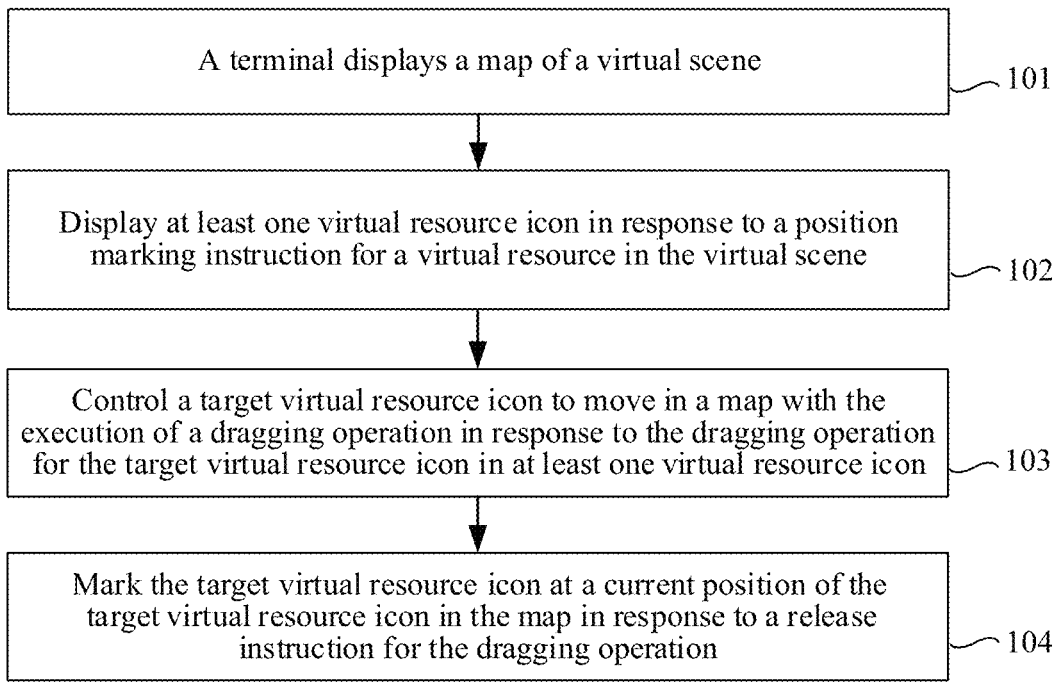
FIG. 3 is a schematic flowchart of a position marking method in a virtual scene according to some embodiments.

The position marking method in the virtual scene provided in some embodiments of this application is described below by taking the implementation with the terminal as an example. Referring to FIG. 3, FIG. 3 is a schematic flowchart of a position marking method in a virtual scene according to some embodiments of this application. The position marking method in the virtual scene according to some embodiments of this application includes:

Operation 101: The terminal displays a map of the virtual scene.

In practical implementation, an application client supporting the virtual scene (such as a game client) may be installed on the terminal, or the client (such as an instant communication client, a live broadcasting client, an education client, and the like) integrated with a virtual scene function may also be installed on the terminal, and based on the application client on the terminal being opened by the user, and the terminal runs the application client, the user may perform the interaction between virtual objects based on a picture of the virtual scene displayed on the client; and for example, in a case that the client is the game client, the user may perform the interaction between game characters (virtual objects) in the game scene based on a game picture displayed on the game client. In some embodiments, the terminal presents the interface of the virtual scene (such as an open-world adventure game), and presents the corresponding map (the scene map) in the interface of the virtual scene, a large number of virtual resources that are used for the player to acquire are stored in the map corresponding to the virtual scene, and the player may also mark various virtual resources at positions of the map. The conventional virtual resources may include a treasure box, an energy stick, and the like.

Figure 4:
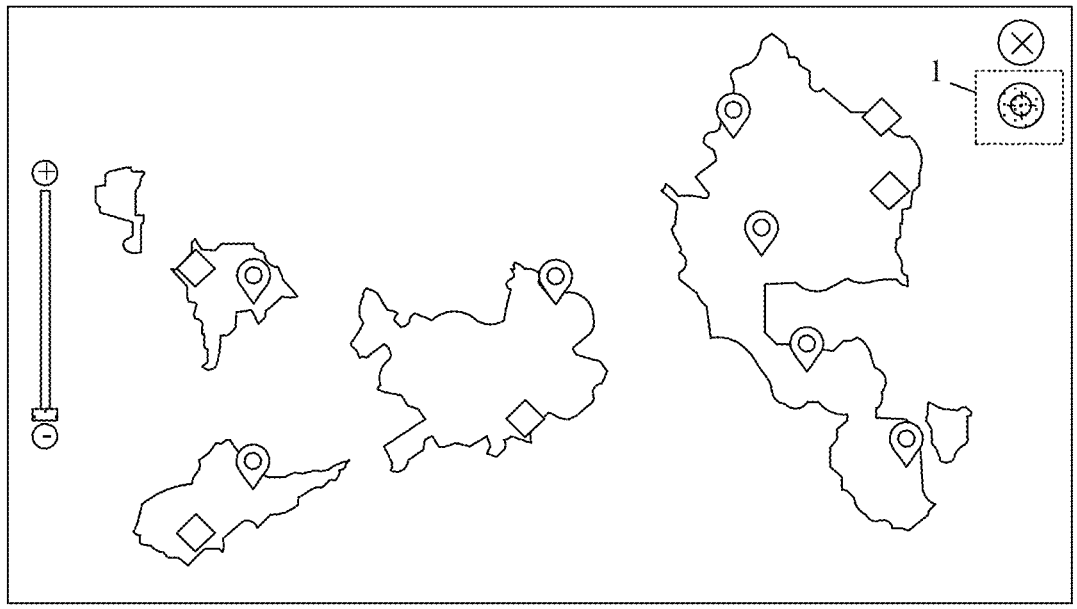
FIG. 4 is a schematic diagram of a map interface of a virtual scene according to some embodiments.

Exemplarily, referring to FIG. 4, FIG. 4 is a schematic diagram of a map interface of a virtual scene according to some embodiments of this application, which may display the virtual resource position in the map of the virtual scene.

Operation 102: Display at least one virtual resource icon based on a position marking instruction for a virtual resource in the virtual scene.

In practical implementation, after receiving the position marking instruction for the virtual resource in the virtual scene, the terminal may display at least one virtual resource icon.

A trigger way for the position marking instruction is described. In some embodiments, prior to displaying the at least one virtual resource icon, the terminal may receive the position marking instruction for the virtual resource in the virtual scene in the following way: the terminal displays a position marking functional item in the interface of the virtual scene; and based on a first trigger operation for the position marking functional item, the position marking instruction for the virtual resource in the virtual scene is received.

In practical implementation, the position marking functional item is displayed in the interface of the virtual scene. The position marking functional item is a control, which may present in various forms, such as a graphic button, a progress bar, a menu, a list, and the like. Some embodiments of this application does not limit this. In a case that the user triggers the position marking functional item, the terminal may receive the position marking instruction for the virtual resource.

Exemplarily, referring to FIG. 4, Number 1 in the figure shows the position marking button, and in a case that the user clicks the position marking button, the terminal may receive the position marking instruction.

In some embodiments, prior to displaying the at least one virtual resource icon, the terminal may receive the position marking instruction for the virtual resource in the following way: the terminal receives a graph drawing operation triggered based on the interface of the virtual scene; and in a case that a graph drawn by the graph drawing operation is matched with a preset graph, the position marking instruction for the virtual resource in the virtual scene is received.

In practical implementation, the user may perform the graph drawing operation for the virtual scene interface at any position on a terminal screen. Based on the graph drawing operation performed by the user, the terminal acquires position information of each point of the graph drawing operation to generate the graph drawn by the graph drawing operation, and matches the drawn graph with a preset graph pre-stored in a graph library for triggering the position marking instruction; and in a case that at least one preset graph succeeds in matching the drawn graph (that is, similarity reaches a similarity threshold, which is set specifically according to the actual needs, such as 0.8), it shows that the position marking instruction for the virtual resource can be triggered after the graph drawing operation is finished. Or, the terminal acquires a drawing trajectory during the graph drawing operation performed by the user, matches a pattern formed by the drawing trajectory with the pre-stored graph, and triggers the position marking instruction for the virtual resource in a case of success in matching. In addition, the terminal may also predict the drawn graphs by a multi-classification model based on artificial intelligence which is deployed on the terminal to classify the graphs, and input information of the multi-classification model is the position information of the drawn graphs, and output information is graph categories to which the drawn graphs belong in the preset graph library.

Figure 5:
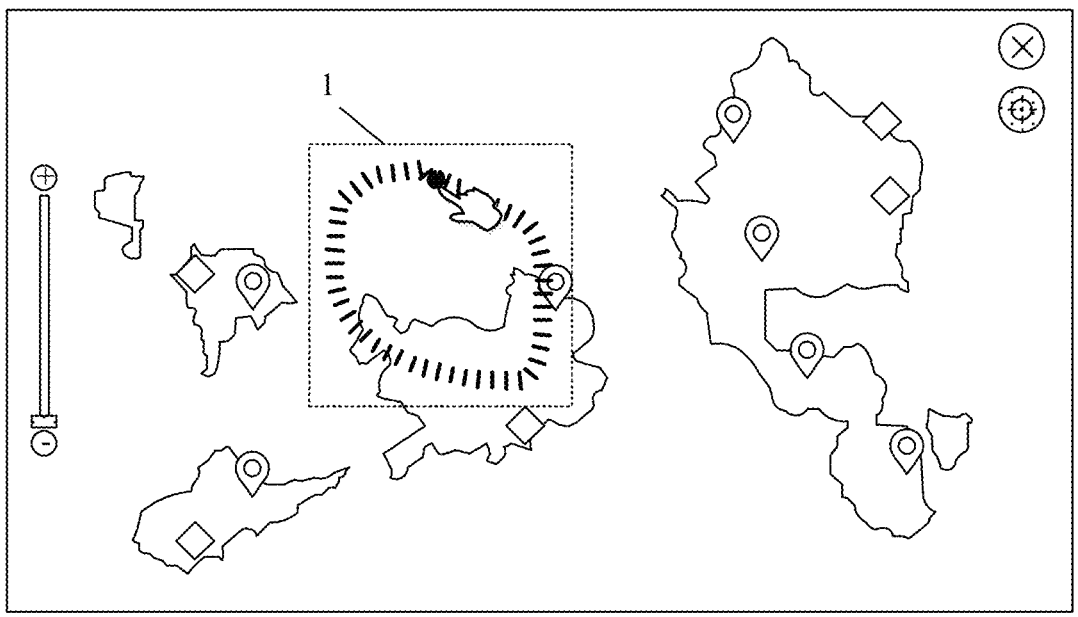
FIG. 5 is a schematic diagram of graph drawing according to some embodiments.

Exemplarily, referring to FIG. 5, FIG. 5 is a schematic diagram of graph drawing according to some embodiments of this application. The user performs the graph drawing operation for the virtual scene interface to obtain the graph shown by Number 1 in the figure (the style of the graph may be diversified, for example, may be circular, triangular, and the like). It is to be noted that, in order not to influence the viewing experience of the user, the graph obtained by the graph drawing operation may not be displayed in the virtual scene interface, that is, the graph shown by Number 1 in the figure may not be displayed in the interface of a practical virtual live broadcasting room.

The way of triggering the position marking instruction by the graph drawing can effectively reduce a screen occupation ratio of the control in the virtual scene interface, and save the screen space occupation rate.

In some embodiments, the terminal may display resource name of the virtual resource indicated by the virtual resource icon in the following way: the terminal acquires an icon display length of the virtual resource icon, and a name display length of the resource name of the virtual resource indicated by the virtual resource icon; and in a case that a sum of the icon display length and the name length does not reach a length threshold, during the display of the virtual resource icon, the resource name of the virtual resource indicated by the virtual resource icon is displayed.

In practical implementation, the terminal receives the position marking instruction for the virtual resource triggered by the foregoing trigger way, and displays at least one virtual resource icon and the resource name of the virtual resource indicated by the virtual resource icon in the virtual scene interface according to an actual situation of the virtual scene displayed on the terminal screen. It is to be noted that, the virtual resource icon and the resource name of the virtual resource indicated by the virtual resource icon may be displayed simultaneously, or only the virtual resource icon may be displayed. The terminal may determine whether the virtual resource icon and the corresponding resource name are displayed simultaneously according to the icon length of the virtual resource icon and the name length of the resource name. The terminal determines a length threshold for simultaneously displaying the virtual resource icon and the corresponding resource name according to a distribution situation of various elements (controls, topics, and the like) in the virtual scene, and simultaneously displays the virtual resource icon and the corresponding resource name in a case that the sum of the icon length and the resource name length does not reach the threshold.

Figure 6A:
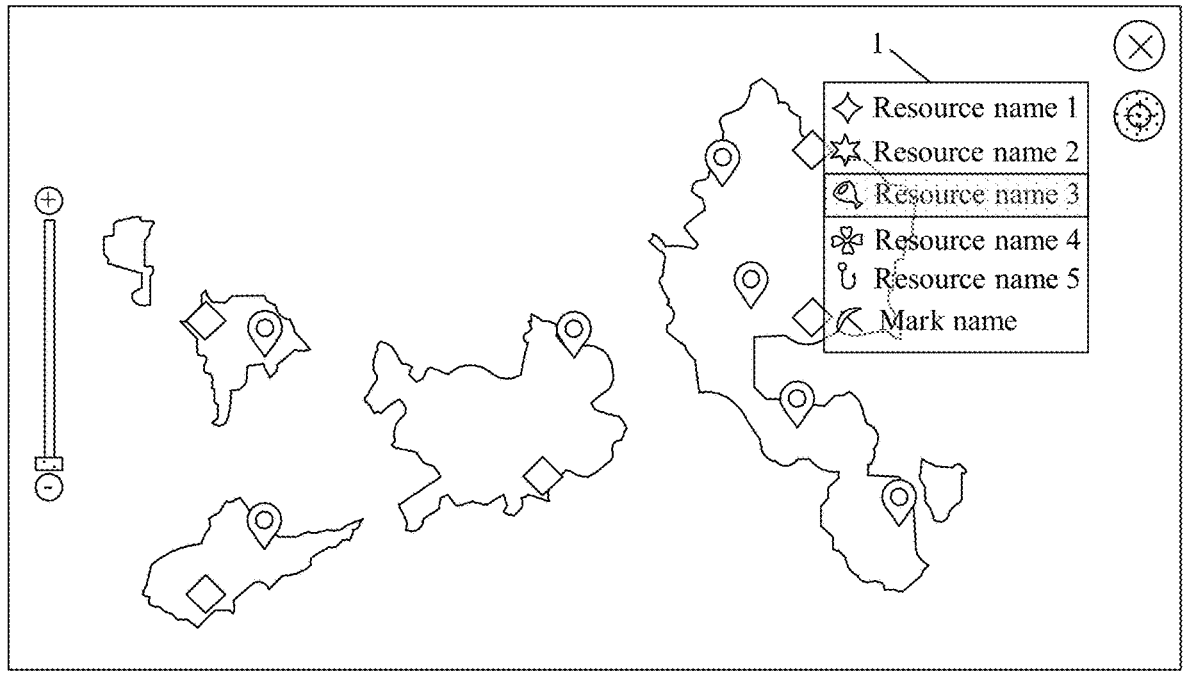
FIG. 6A to FIG. 6B are schematic diagrams of display of a virtual resource icon according to some embodiments.
Figure 6B:
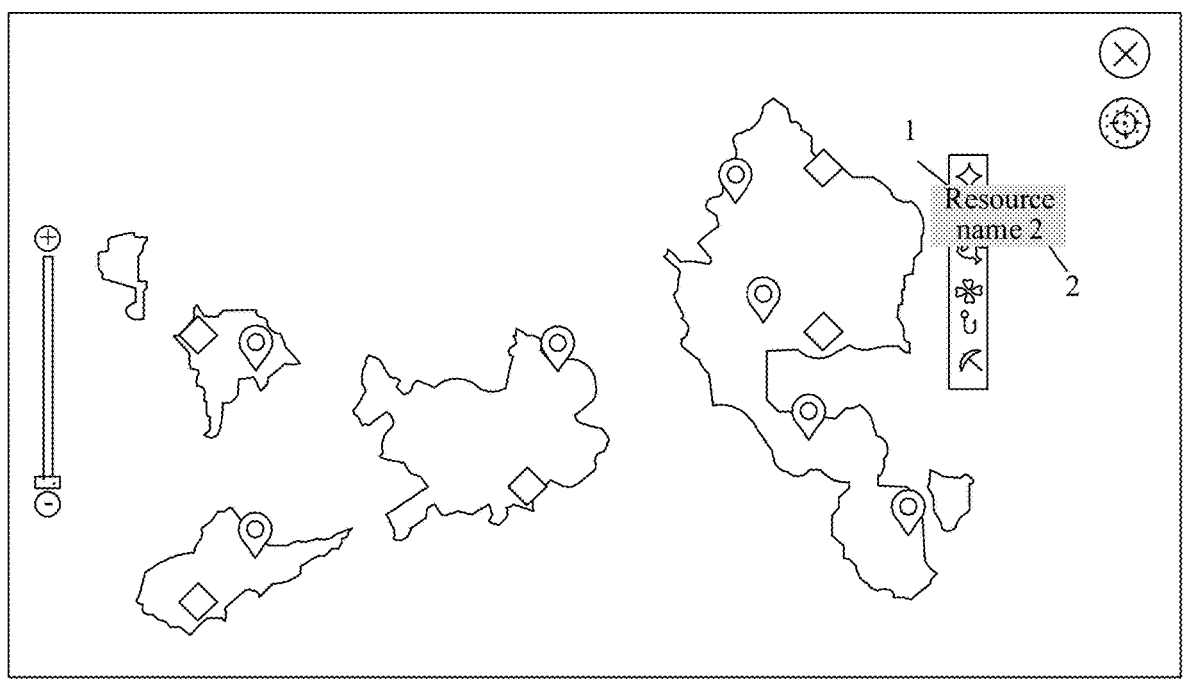

Exemplarily, FIG. 6A to FIG. 6B are schematic diagrams of display of a virtual resource icon according to some embodiments of this application. Referring to FIG. 6A, the virtual resource icon and the corresponding resource name are displayed at the same time in FIG. 6A.

The way of simultaneously displaying the virtual resource icon and the corresponding resource name can intuitively display the virtual resource name, and improve the human-computer interaction experience.

In some embodiments, the terminal may display the resource name of the virtual resource indicated by the virtual resource icon in the following way: in a case that the sum of the icon display length and the name display length reaches a width threshold, the terminal hides the resource name of the corresponding virtual resource during the display of the virtual resource icon, and displays the resource name of the virtual resource indicated by the virtual resource icon in a form of a suspension layer in a case that the virtual resource icon is in a selected state. Thus, in a case that the sum of the icon display length and the name display length reaches the width threshold, the resource occupation is reduced by the way of hiding the resource name, and the display space is released. In a case that the virtual resource icon is in the selected state, the resource name of the selected virtual resource icon is displayed in the way of the suspension layer, which enriches the display way of the information, so that the resource name is more flexible to display, and the utilization rate of the display resource is increased.

In practical implementation, in a case that the terminal judges that the sum of the icon display length and the name display length reaches the width threshold, only the virtual resource icon may be displayed, that is, in a case of displaying the virtual resource icon, the name of the corresponding virtual resource is hidden, and in a case that the user moves a cursor to any virtual resource icon, the resource name of the virtual resource indicated by the current virtual resource icon may be displayed in the form of the suspension layer. It is to be noted that, the terminal may also provide a setting interface for a display mode of the virtual resource icon, and displays the virtual resource icon in the virtual interface by adopting a set target display mode.

Exemplarily, referring to FIG. 6B, Number 1 in FIG. 6B shows a display way of the virtual resource icon, in the figure, only the virtual resource icon is displayed, and the resource name of the virtual resource is hidden; and in a case of moving the cursor to any virtual resource icon, the resource name is displayed in the form of the suspension layer, such as the resource name display way shown by Number 2 in the figure.

The foregoing way of only displaying the virtual resource icon can reduce the space utilization rate of the virtual interface, and improve the human-computer interaction experience.

In some embodiments, the terminal may display the virtual resource icon in the following way: the terminal displays an icon suspension layer in the interface of the virtual scene based on the position marking instruction for the virtual resource in the virtual scene, and displays at least one virtual resource icon by adopting a target display style in the icon suspension layer; and the target display style includes at least one of a list display style, and a wheel-disc display style.

In practical implementation, the terminal provides a setting interface for setting the display style displaying at least one virtual resource icon. In the setting interface, at least one display style option is shown, including, but not limited to a list display style option, a wheel-disc display style option, and the like. The terminal determines the target display style corresponding to the target display style option as the display style of the at least one virtual resource icon based on a selection operation for the target display style option in at least one display style option. After determining the target display style, the terminal may display at least one virtual resource icon by adopting the target display style in the virtual scene interface in the form of the suspension layer.

Figure 7:
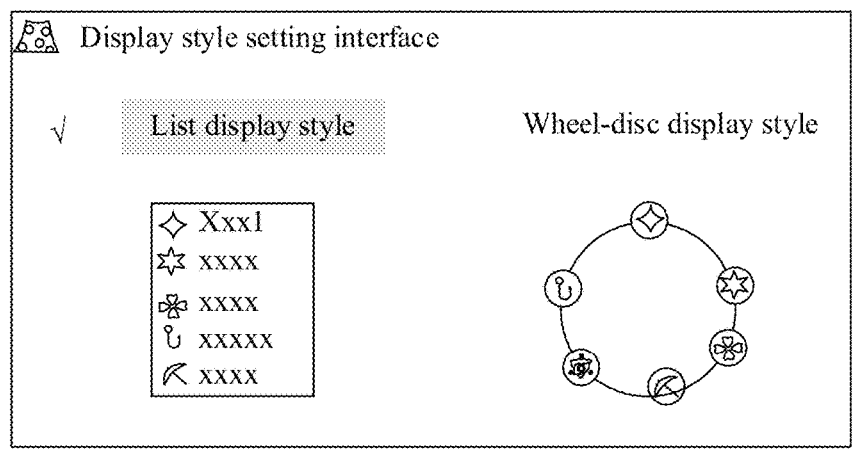
FIG. 7 is a schematic diagram of a target display style according to some embodiments.
Figure 8:
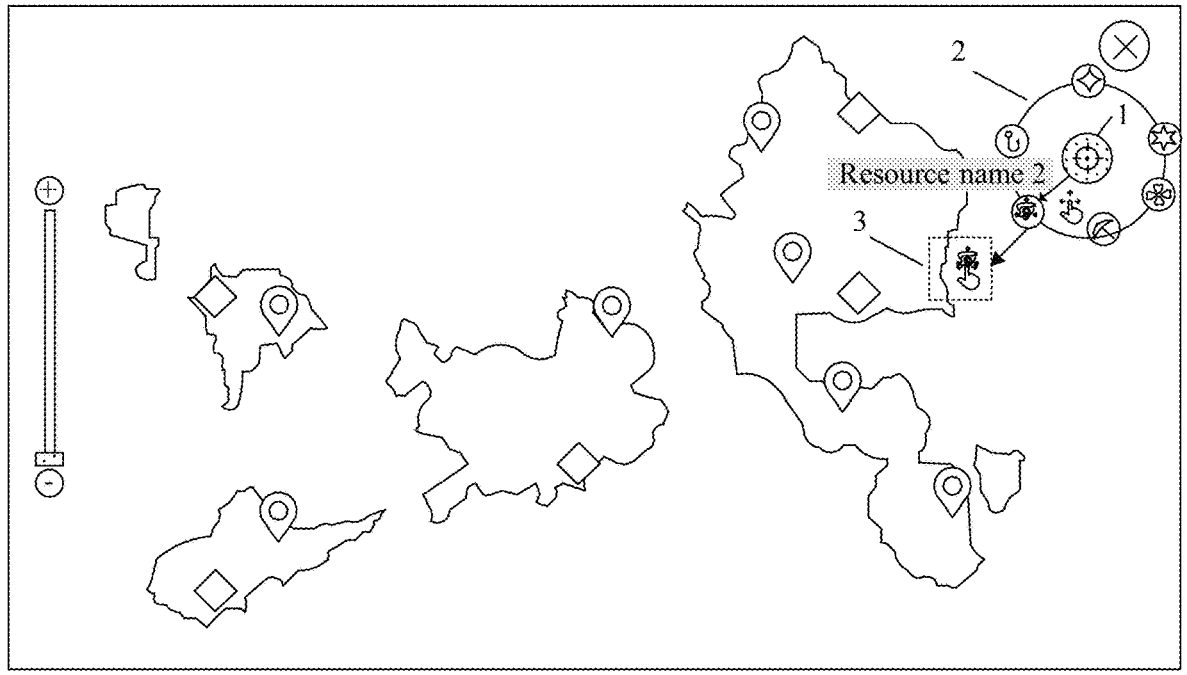
FIG. 8 is a schematic diagram of a wheel-disc display style according to some embodiments.

Exemplarily, referring to FIG. 7, FIG. 7 is a schematic diagram of a target display style according to some embodiments of this application, and in the figure, two target display style options are shown, and a sample graph corresponding to each target display style option is displayed. In a case that the target display style is the list display style, the display style of at least one virtual resource icon is shown in FIG. 6A to FIG. 6B. Referring to FIG. 8, FIG. 8 is a schematic diagram of a wheel-disc display style according to some embodiments of this application. In FIG. 8, the terminal determines the target display style for at least one virtual resource icon to be the wheel-disc display style. Based on a long-press operation for a position functional item (shown by Number 1 in the figure), the terminal calls a wheel disc (shown by Number 2 in the figure) for displaying at least one virtual resource icon. In a case of sliding the cursor from the position functional item to any virtual resource icon in the wheel disc, the resource name of the virtual resource indicated by the virtual resource icon may be displayed in the form of the suspension layer. It is to be noted that, at least one virtual resource icon of the wheel-disc display style may be located at any position in the virtual interface.

The display style for at least one virtual resource icon can satisfy the personalized needs of the users, thereby improving the human-computer interaction experience.

In some embodiments, the terminal may display the virtual resource icon in the following way: in a case that a virtual resource icon in a disabled state exists in the at least one virtual resource icon, the terminal displays prompt information based on a trigger operation for the virtual resource icon in the disabled state; and the prompt information is used for prompting that the marking number of the virtual resource corresponding to the virtual resource icon in the disabled state already reaches the number threshold.

In practical implementation, the marking number of the virtual resource corresponding to any virtual resource icon may be required, in a case that the marking number for a certain virtual resource in the map of the virtual scene reaches the corresponding number threshold, the virtual resource indicated by the virtual resource icon cannot be continued to be marked, correspondingly, the virtual resource icon may be in the disabled state, which is used for prompting the user that the virtual resources indicated by the current virtual resource icon in the map already reaches a number threshold.

Figure 9:
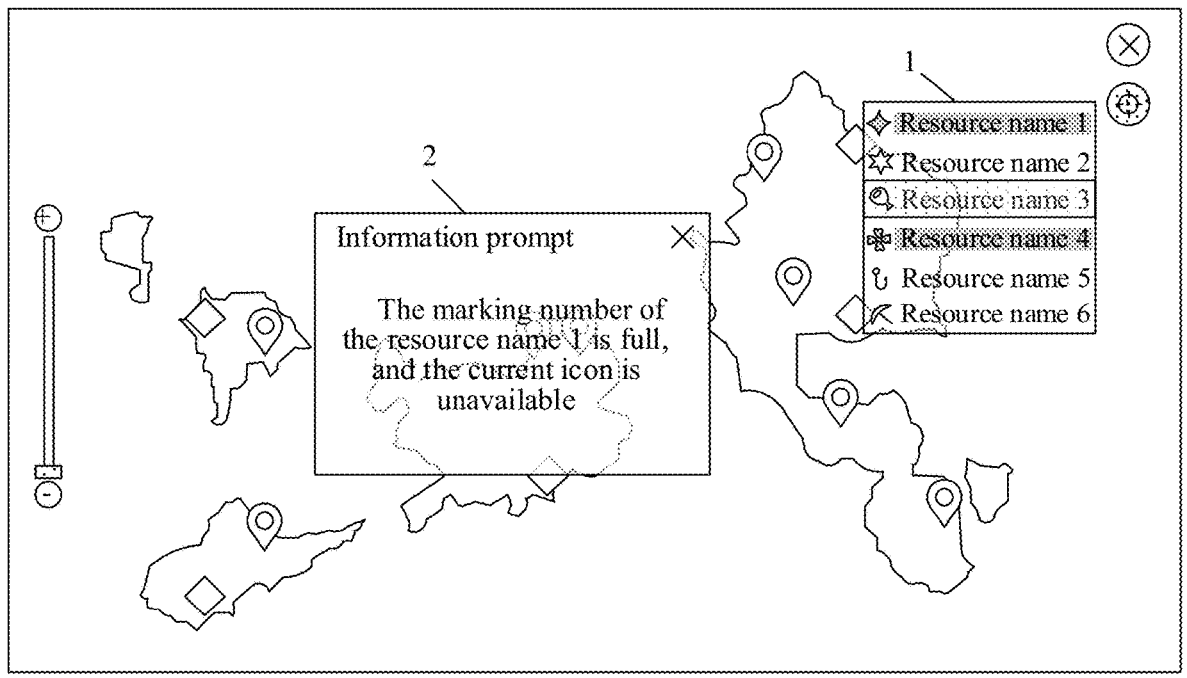
FIG. 9 is a schematic diagram of information prompt according to some embodiments.

Exemplarily, referring to FIG. 9, FIG. 9 is a schematic diagram of information prompt according to some embodiments of this application. In the figure, the virtual resource icon and the resource name (shown by Number 1 in the figure) are displayed simultaneously by adopting the list display style. A "resource name 1" and a "resource name 2" are in the disabled state, and other virtual resource icons are in an available state. The terminal presents the suspension layer shown by Number 2 in the figure in the interface of the virtual scene based on the trigger operation (click operation) for the "resource name 1" in the disabled state, and the suspension layer displays the prompt information that "the marking number of the resource name 1 reaches the threshold, and the current icon is not available".

In some embodiments, the terminal may edit the resource name of the virtual resource in the following way: the terminal controls the resource name of the virtual resource indicated by the virtual resource icon to be in an editable state based on the trigger operation for the virtual resource icon; and the terminal displays the edited resource name based on an edition operation for the resource name in the editable state.

In practical implementation, the terminal may provide the edition operation for the resource name indicated by the virtual resource icon, and the terminal controls the resource name to be in the editable state based on the trigger operation (such as a double-click operation for the virtual resource name) for the resource name, receives the edition operation (re-input) for the selected resource name, and determines the modified resource name.

Figure 10:
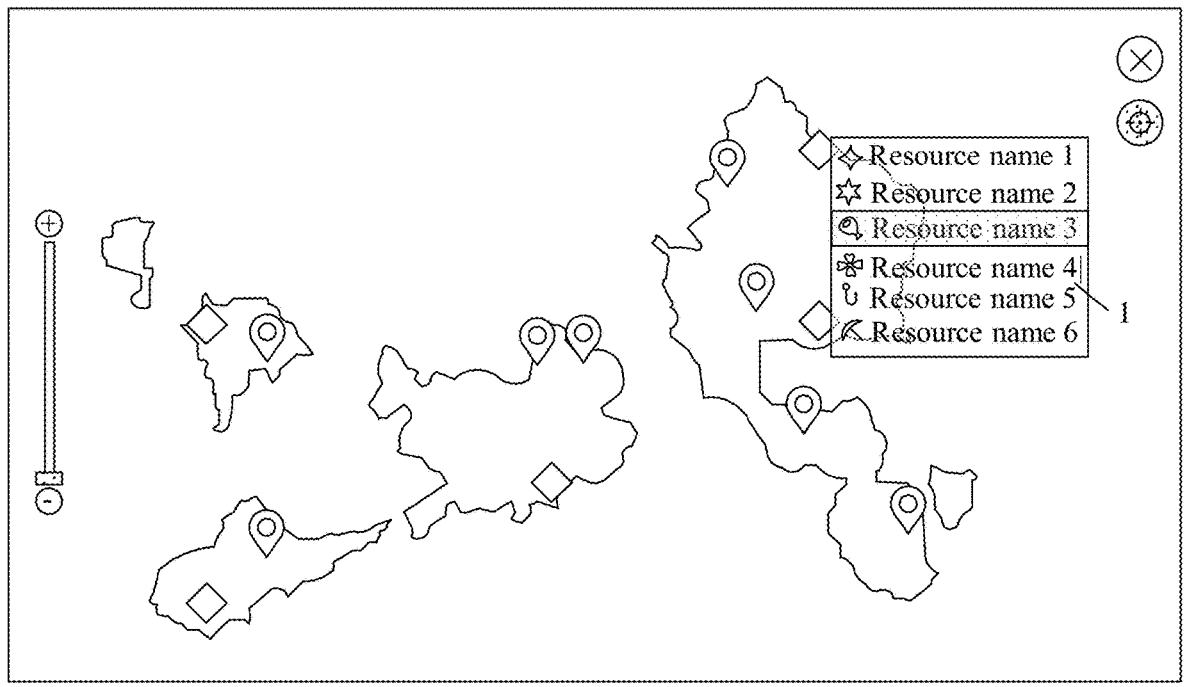
FIG. 10 is a schematic diagram of resource name modification according to some embodiments.

Exemplarily, referring to FIG. 10, FIG. 10 is a schematic diagram of resource name modification according to some embodiments of this application. In FIG. 10, the terminal receives the double-click operation for a "resource name 4", and controls the "resource name 4" to be in the editable state, then the cursor flashes in an input box where the "resource name 4" is located to prompt the user that a new resource name may be inputted, and the inputted new resource name is displayed.

Operation 103: Control the target virtual resource icon to move in the map with the execution of a dragging operation based on the dragging operation for the target virtual resource icon in at least one virtual resource icon.

In practical implementation, the terminal may control the virtual resource icon to move along a dragging trajectory of the dragging operation in the map with the execution of the dragging operation based on the dragging operation for the target virtual resource icon.

In some embodiments, the terminal may control the target virtual resource icon to move in the map in the following way: the terminal controls the target virtual resource icon in a suspension state to move in the map with the execution of the dragging operation based on the dragging operation for the target virtual resource icon in the suspension state in the at least one virtual resource icon.

In practical implementation, the terminal may perform the dragging operation on the target virtual resource icon in the suspension state. There are various ways of controlling the virtual resource icon to be in the suspension state. In some embodiments, the terminal may provide a setting for whether the virtual resource icon is in the floating state.

In some embodiments, the terminal may control the virtual resource icon to be in the suspension state in the following way: the terminal acquires operation parameters of a press operation based on the press operation for the target virtual resource icon in the at least one virtual resource icon, and the operation parameters include at least one of the following: operation duration, and pressure; and in a case that the operation duration reaches a duration threshold or the pressure reaches a pressure threshold, the terminal controls the target virtual resource icon to be in the suspension state.

In practical implementation, the terminal may acquire the press operation parameters such as operation duration, pressure and the like based on the press operation for the virtual resource icon, compares the operation duration with a preset duration threshold, or compares the pressure with the preset pressure, and may control the target virtual resource icon to be in the suspension state in a case that the operation duration is greater than the preset duration threshold, or the pressure is greater than the pressure threshold.

In view of the above way of triggering the target virtual resource icon to be in the suspension state by performing the press operation for the virtual resource icon, in practical application, in a case that the user wants to mark the target virtual resource icon in the map, the press operation is firstly performed to enable the virtual resource icon to be in the suspension state, and then the target virtual resource icon in the suspension state is dragged to move in the map to reach the position to be marked by the user. The suspension and dragging process of the target virtual resource icon may be completed in one operation, so that the operation is simple, and it is convenient for the user to realize quick address selection and marking for the resource icon.

Exemplarily, referring to FIG. 8, the terminal calls the wheel disc (shown by Number 2 in the figure) displaying the virtual resource icon based on a long-press operation for the position marking button shown by Number 1, then the long-press operation is directly switched to a sliding operation from the position marking button to the icon of the "resource name 2" (the target virtual resource icon), in a case that the icon of the "resource name 2" is already in the suspension state, the sliding operation is switched to the dragging operation for the target resource icon (shown by Number 3 in the figure), and the icon of the "resource name 2" is controlled to move on the map with the execution of the dragging operation; and in a case that the icon of the "resource name 2" is in a non-suspension state (a stationary state), the cursor slides to the icon of the "resource name 2", and the icon of the "resource name 2" is pressed until the icon of the "resource name 2" is in the suspension state, and then the long-press operation for the icon of the "resource name 2" is switched to the dragging operation for the icon of the "resource name 2", so that the icon of the "resource name 2" is controlled to move on the map with the execution of the dragging operation.

The way of controlling the target virtual resource icon to move in the map can quickly and conveniently realize the movement of the target virtual resource icon in the map by using the consecutive actions, and improve the human-computer interaction experience.

In some embodiments, the terminal may also control the target virtual resource icon to move in the map in the following way: the terminal displays at least one virtual resource icon in a movable state based on the position marking instruction for the virtual resource in the virtual scene; correspondingly, based on the dragging operation for the target virtual resource icon in the at least one virtual resource icon in the movable state, an icon duplicate in the movable state corresponding to the target virtual resource icon is generated; and the icon duplicate in the movable state is controlled to move in the map with the execution of the dragging operation.

In practical implementation, in a case that the virtual resource icon is in the movable state, the icon duplicate of the virtual resource icon may also be created, and based on the dragging operation for the icon duplicate, the icon duplicate is controlled to move in the map, so that the non-vacancy of the original virtual resource icon can be ensured, and the display attractiveness of the virtual resource icon is ensured.

In some embodiments, the terminal may display a real-time position of the target resource icon in the following way: in a process of controlling the target virtual resource icon to move in the map with the execution of the dragging operation, the terminal acquires the real-time position of the target virtual resource icon; and the terminal displays a partial enlarged interface including the real-time position at the same time.

In practical implementation, in a case that the terminal controls the target virtual resource icon to move in the map, in order to display the real-time position of the target virtual resource icon in the map in real time without changing the map scale or without manually dragging the map, the partial enlarged interface including the real-time position of the target virtual resource may be displayed synchronously in the map.

Figure 11:
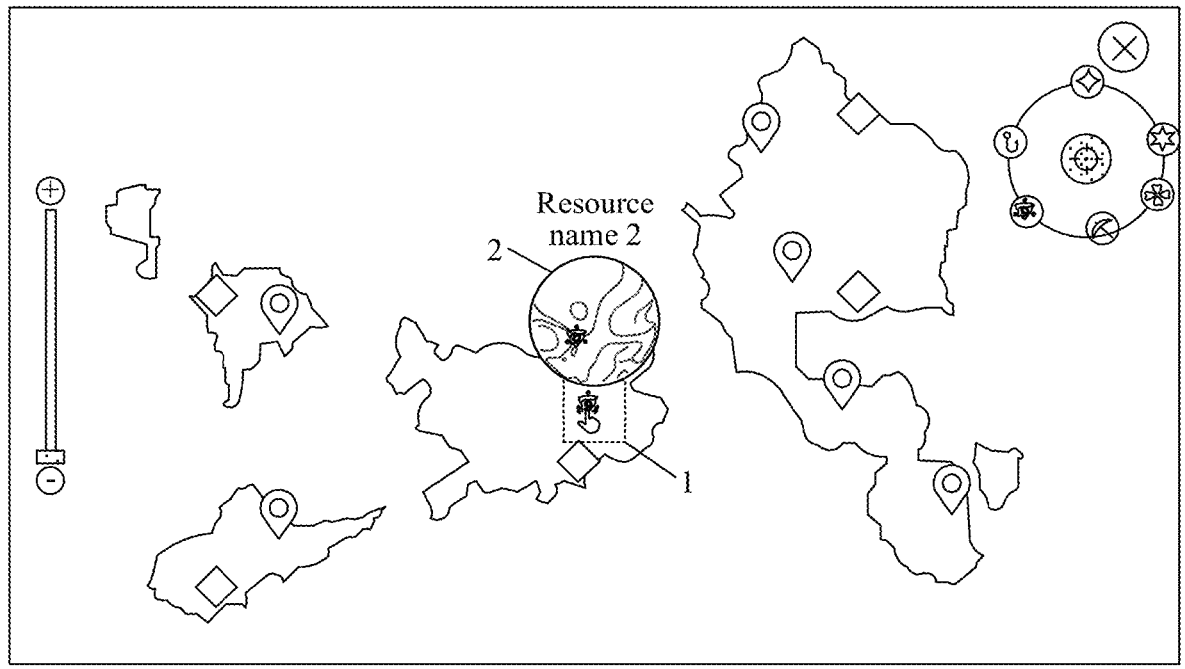
FIG. 11 is a schematic diagram of a partial enlarged interface according to some embodiments.

Exemplarily, referring to FIG. 11, FIG. 11 is a schematic diagram of a partial enlarged interface according to some embodiments of this application. In FIG. 11, the terminal controls the target resource icon to move in the map based on the dragging operation for the target resource icon (shown by Number 1 in the figure), and simultaneously displays the partial enlarged interface (shown by Number 2 in the figure) including the real-time position in the interface of the virtual scene in order to determine the real-time position of the target resource in the map, and in the partial enlarged interface shown by Number 2, the position of the current target resource icon and a peripheral situation of the position may be displayed clearly.

The way of displaying the real-time position of the target resource icon by the partial enlarged interface can accurately display the real-time position of the virtual resource icon without moving the map and changing the map scale, i.e., in a case of the minimal map scale, and is unnecessary for the user to change the map scale or manually drag the map, thereby improving the human-computer interaction experience.

In some embodiments, the terminal may display the partial enlarged interface in the following way: the terminal displays a target area in the interface of the virtual scene, and synchronously displays the partial enlarged interface including the real-time position in the target area.

In practical implementation, the terminal may adopt a stationary way to synchronously display the partial enlarged interface including the real-time position. The terminal may provide a setting interface for a display form of the partial enlarged interface, provide at least two display form options, such as a follow-up form and a stationary form, and display the stationary partial enlarged interface in the interface of the virtual scene based on a selection operation for the stationary option. That is, the partial enlarged interface including the real-time position of the target virtual icon is displayed in a suitable area in the interface of the virtual scene. It is to be noted that, the target area may be in a quadrilateral shape, a circular shape, and the like, and in addition, the target area may be movable, that is, the position of the target area may be moved according to actual needs of the user.

Figure 12:
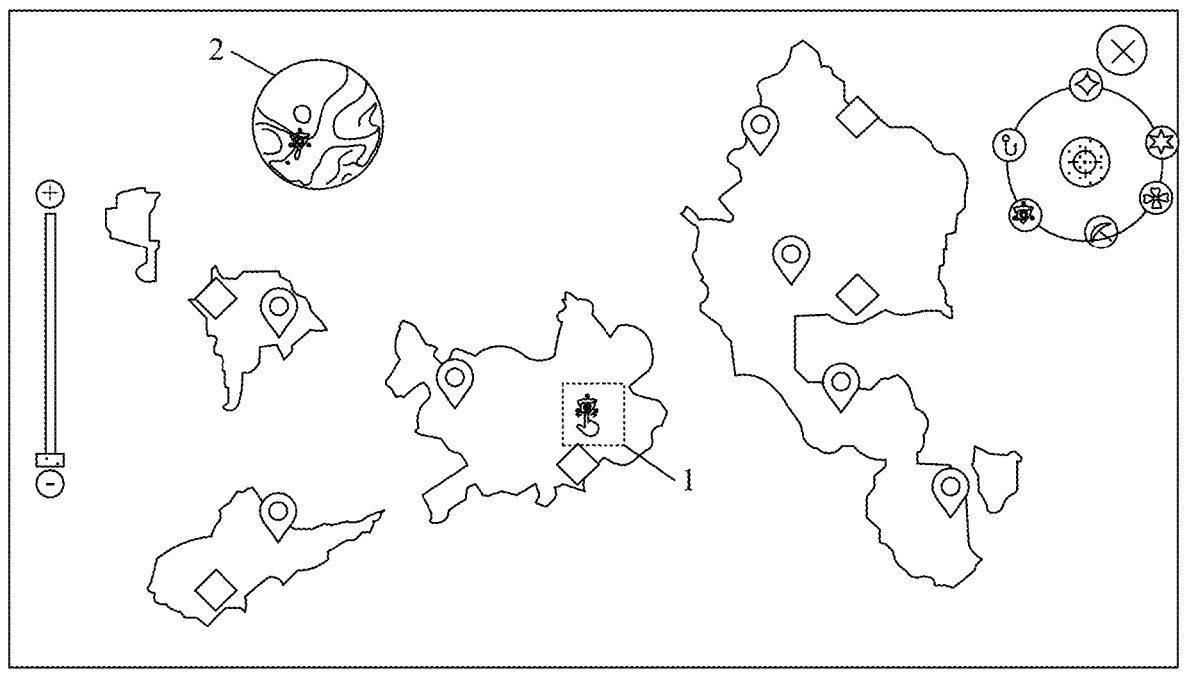
FIG. 12 is a schematic diagram of a stationary partial enlarged interface according to some embodiments.

Exemplarily, referring to FIG. 12, FIG. 12 is a schematic diagram of a stationary partial enlarged interface according to some embodiments of this application. In the figure, the terminal synchronously displays the partial enlarged interface of the real-time position of the target virtual icon in the target area (the circular area) shown by Number 2 based on the dragging operation for the target virtual resource icon shown by Number 1.

In some embodiments, the terminal may also display the partial enlarged interface in the following way: the terminal synchronously displays an accompanying suspension layer associated with the target virtual resource icon, and displays the partial enlarged interface including the real-time position in the accompanying suspension layer.

In practical implementation, the terminal may adopt a follow-up way to synchronously display the partial enlarged interface including the real-time position. The terminal may provide the setting interface for the display form of the partial enlarged interface, provide at least two display form options, such as a follow-up form and a stationary form, and display the follow-up partial enlarged interface in the interface of the virtual scene based on the selection operation for the follow-up option.

Exemplarily, referring to FIG. 11, the partial enlarged interface shown by Number 2 in the figure is the follow-up form, that is, in the process of controlling the virtual resource icon corresponding to the "resource name 2" to move in the map, the terminal synchronously displays the accompanying suspension layer associated with the virtual resource icon corresponding to the "resource name 2", the accompanying suspension layer may move with the movement of the virtual resource icon corresponding to the "resource name 2", and displays the partial enlarged interface including the real-time position of the virtual resource icon corresponding to the "resource name 2" in real time in the accompanying suspension layer.

Operation 104: Mark the target virtual resource icon at the current position of the target virtual resource icon in the map based on a release instruction for the dragging operation.

In practical implementation, in the process of controlling the target virtual resource icon to move in the map, the terminal marks the target virtual resource icon at the current position of the target virtual resource icon in the map based on the release instruction for the dragging operation. At the time, the marking mode may be understood as a single-point marking mode, that is, the marking operation for the target virtual resource icon only marks one position every time.

In some embodiments, the terminal may be triggered in various ways to enter the multi-point marking mode for the target virtual resource icon. For example, the terminal displays a multi-point marking mode switch in the interface of the virtual scene, and based on the trigger operation for the multi-point marking mode switch, the terminal enters the multi-point marking mode for the target virtual resource icon, that is, in a case that the multi-point marking mode switch is turned on, the terminal enters the multi-point marking mode, and in a case that the multi-point marking mode switch is turned off, the terminal is in a single-point marking mode; and for another example, based on a first trigger operation for the target virtual resource icon in the at least one virtual resource icon, the terminal controls to enter the multi-point marking mode for the target virtual resource icon.

In practical implementation, the terminal may also start the multi-point marking mode for the target virtual resource icon, and in the multi-point marking mode, the marking operation for the target resource icon may be performed consecutively for multiple times. The terminal may control to enter the multi-point marking mode for the target virtual resource icon based on the trigger operation (such as double click, and the like) for the target resource icon.

Correspondingly, in some embodiments, the terminal may mark the target virtual resource icon in the following way: in the multi-point marking mode, the terminal controls the target virtual resource icon to be in a cursor follow-up state, and marks the target virtual resource icon at a first position in the map based on the click operation for the first position in the map, and marks the target virtual resource icon at a second position in a case of receiving the click operation for the second position in the map after marking the target virtual resource icon at the first position.

In practical implementation, in the multi-point marking mode, the terminal controls the target virtual resource icon to move with the cursor, and marks the target virtual resource icon at the position A based on the click operation for the position A in the map. Then the target virtual resource icon continues to move with the cursor, and based on the click operation for a position B in the map, the target virtual resource icon is marked at the position B.

Figure 13:
FIG. 13 is a schematic diagram of a multi-point marking mode according to some embodiments.

Exemplarily, referring to FIG. 13, FIG. 13 is a schematic diagram of a multi-point marking mode according to some embodiments of this application. The terminal controls to perform the multi-point marking mode based on a double-click operation for the resource icon of the "resource name 2", and marks the resource icon at the position shown by Number 1. The dragging operation for the resource icon is continued to be performed, and the resource icon again is marked again at the position shown by Number 2. Finally, the resource icon is marked for the third time at the position shown by Number 3, that is, in the multi-point marking mode, the resource icon of the "resource name 2" is marked consecutively for three times.

The way of starting the multi-point marking mode performs multi-point marking for the target virtual resource icon, that is, the user may realize multiple consecutive marking for the target virtual resource icon by one trigger for the target virtual resource icon, so that the marking efficiency for the resource icon is improved effectively, the number of operations is reduced, and the human-computer interaction experience is improved.

In some embodiments, the terminal may control to exit the multi-point marking mode in the following way: the terminal switches the display style of the target virtual resource icon from a first display style to a second display style; and correspondingly, after marking the target virtual resource icon at the second position, the terminal controls to exit the multi-point marking mode based on a second trigger operation for the target virtual resource icon, and switches the display style of the target virtual resource icon from the second display style to the first display style.

In practical implementation, the terminal may control to exit the multi-point marking mode for the target resource icon based on other trigger operations for the target virtual resource icon, and changes the display style of the target resource icon, and the first display style here is the style of the target resource icon in the multi-point marking mode; and the second display style is the style of the target resource icon exiting the multi-point marking mode (the normal marking mode or the single-point marking mode).

Exemplarily, referring to FIG. 13, during the dragging operation for the target resource icon (shown by Number 4 in the figure), in a case that the target resource icon in the icon wheel disc receives the click operation again, the terminal exits the multi-point marking mode for the target resource icon, and restores the display style of the target resource icon to the first display style.

The way of exiting the multi-point marking mode can flexibly control the start and close of the multi-point marking mode, thereby improving the marking efficiency.

In some embodiments, the terminal may realize the multi-point marking for the target resource icon in the following way: the terminal displays a dragging trajectory corresponding to the dragging operation in the virtual scene, and takes an area corresponding to a closed graph as a multi-point marking area in a case that the graph corresponding to the dragging trajectory on the map is a closed graph; and correspondingly, the terminal marks the target virtual resource icon respectively at each markable resource position in the unmarked state in the multi-point marking area based on the release operation for the dragging operation.

In practical application, there are a plurality of markable resource positions in the map, and the terminal may indicate the markable resource position, so that the user knows that the position is the markable resource position. Of course, the terminal may also indicate the un-markable resource position that is already marked by the user, so that the user knows the overall situation of the markable resource position and un-markable resource position in the map. In order to quickly mark the plurality of markable resource positions, a way of drawing the closed graph may be used. The user drags the target resource icon to form the dragging trajectory with the drawn graph of the closed graph to select the plurality of markable resource positions so as to quickly mark the resource icon, thereby improving the marking efficiency for the resource icon.

In practical implementation, in the multi-point marking mode for the target resource icon, the terminal may also select the multi-point marking area according to the dragging operation for the target resource icon, and marks at least one target virtual resource icon at the same time in the multi-point marking area after receiving the release instruction for the dragging operation.

Figure 14:
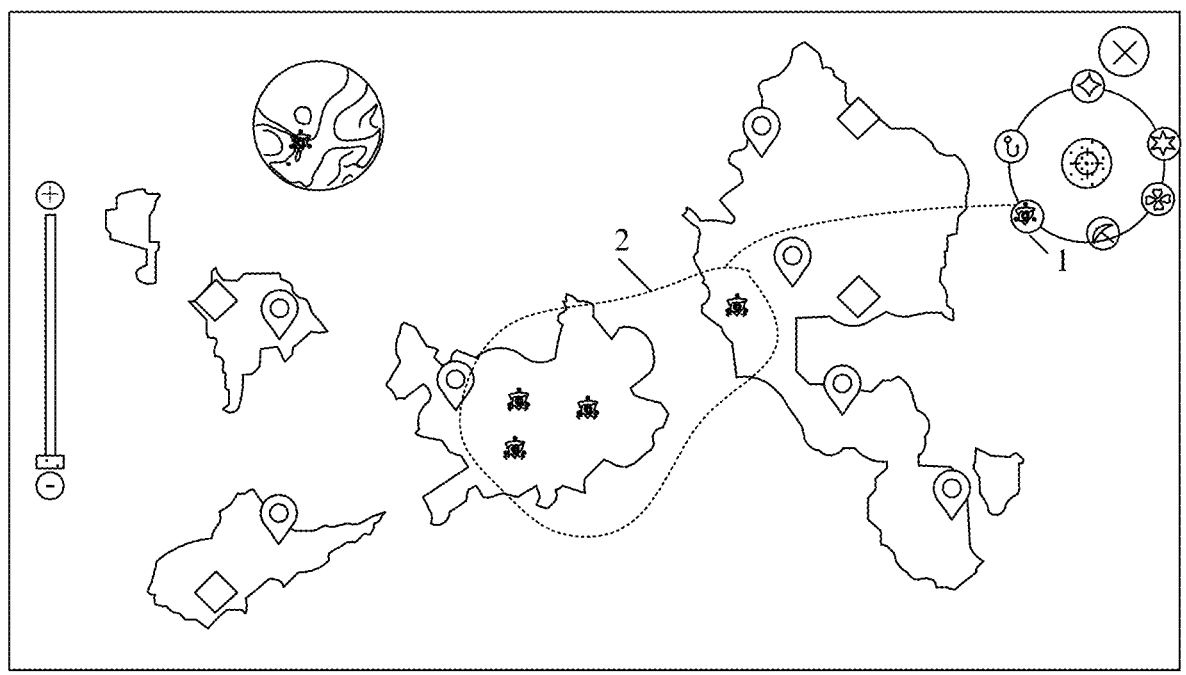
FIG. 14 is a schematic diagram of a multi-point marking area according to some embodiments.

Exemplarily, referring to FIG. 14, FIG. 14 is a schematic diagram of a multi-point marking area according to some embodiments of this application. In the figure, the terminal displays the dragging trajectory (shown by Number 2 in the figure) corresponding to the dragging operation based on the dragging operation for the target resource icon shown by Number 1. The dragging trajectory can form the closed graph. In the closed graph, the resource positions in the unmarked state on the map are acquired. The terminal receives the release instruction for the dragging operation, and marks 4 target virtual icons as shown in the figure.

The way of determining the multi-point marking area in the multi-point marking mode can greatly reduce the multi-point marking operation operations, thereby improving the marking efficiency.

By using some embodiments of this application, through different trigger operations for the target virtual resource icon in different display states, the target virtual resource icon is controlled to move in the map, in the movement process, the partial enlarged interface including the real-time position of the target virtual resource icon is displayed synchronously, and based on the release instruction for the dragging operation, the target virtual resource icon is marked in the map, so that the quick and accurate marking is performed on the map in a combination way of quick drag and partial enlargement without changing the map scale and position, and the touch by mistake is also avoided.

An exemplary application of the embodiment of this application in an actual application scenario is described below.

Figure 15:
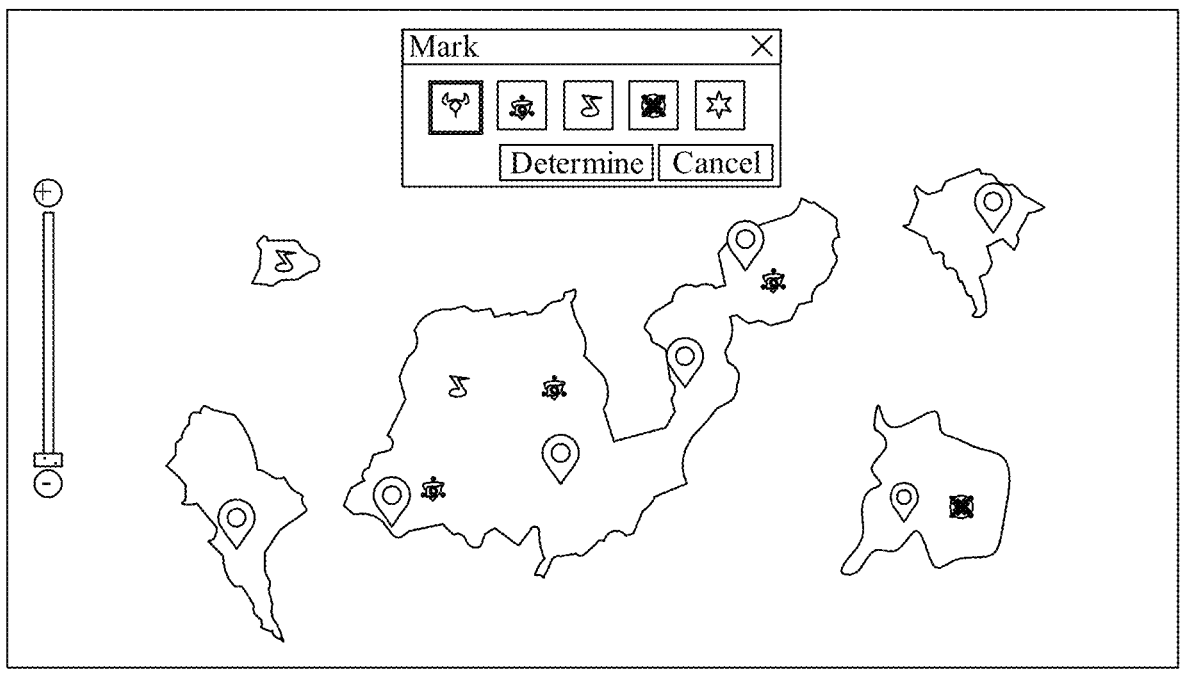
FIG. 15 is a schematic diagram of map marking in related technologies.

In related technologies, referring to FIG. 15, FIG. 15 is a schematic diagram of map marking in related technologies. In the figure, in a virtual scene corresponding to an open world, a player clicks a position on the map to trigger a marking pop-up window for marking, but the position marking way may have the following problems:

there are too many clicks: in a case of marking a certain position on the map, multiple clicks are required; in a case of repeated marking, more clicks are required; and at the same time, since the marking points may be scattered at different positions of the map, the player is required to continuously adjust the map position to perform the fixed-point marking;

accurate marking cannot be realized: in a case that the player wants to mark at different positions of a big world map, in a case of zooming out the map, it is difficult for the player requiring the accurate marking to control the marking to fall on an accurate place;

other places are easy to touch by mistake: since most of games have a lot of transfer points and task points, in a case that the place close to these points is clicked for marking, the player is easy to touch the points by mistake, which influences the operation experience of the player; and after the map is zoomed out, it is necessary to frequently change the map position for marking:

in a case that the player wants to mark at different positions of the big world map, in a case of zooming out the map, it is difficult to mark the accurate place, and in a case of zooming in the map, it is necessary to continuously drag the map to change the position, thereby increasing the operations of the player.

Based on this, some embodiments of this application provide a position marking method in a virtual scene. The method firstly tries to reduce the clicks of the player only in the dragging way, can also avoid the touch by mistake, and can enable the player to complete the marking process without interruption; and the method improves a magnifier effect in the big map, so that it is ensured that the user may also perform the accurate marking in a bigger map area without moving the map in a case of the small map scale.

Figure 16:
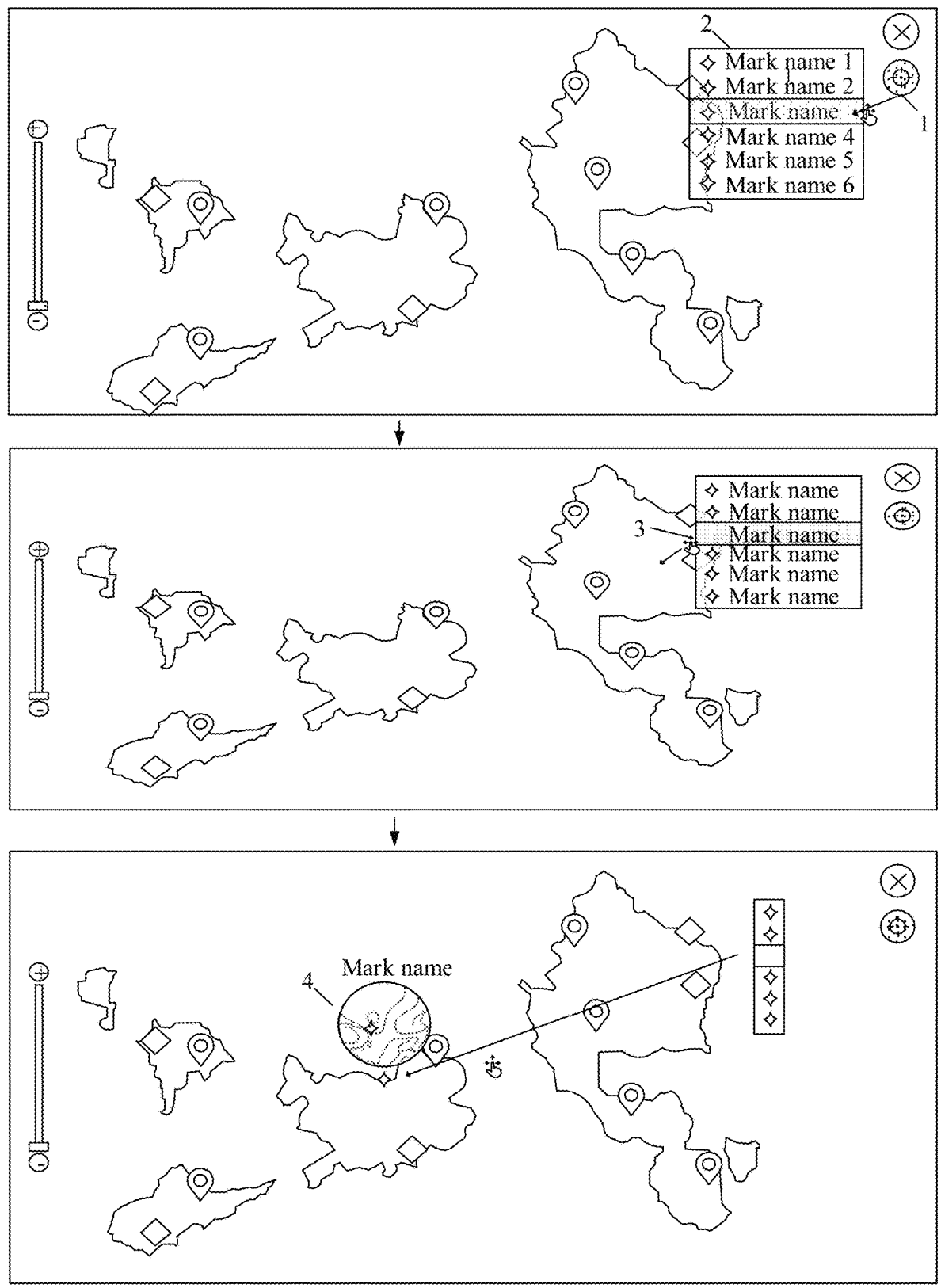
FIG. 16 is a flowchart of position marking operations for a virtual resource according to some embodiments.

The position marking method provided in some embodiments of this application is described below. In some embodiments, referring to FIG. 16, FIG. 16 is a flowchart of a position marking operation for a virtual resource according to some embodiments of this application. The player presses or clicks a marking button (shown by Number 1 in the figure) on the map for a long time to trigger a position marking instruction, and the terminal displays a mark classification list shown by Number 2 in the figure (also referred to as a resource icon list) based on the position marking instruction; then the player drags the marking button into the outbound mark classification list and selects a mark or drags the mark in the list after clicking on the outbound list (the target mark shown by Number 3 in the figure); the player moves the target mark to a specific place on the map, followed by a magnifier (shown by Number 4 in the figure); and finally, the player drags the target mark to a target position in the map, releases fingers to release the dragging operation for the target mark, and displays the target mark at the target position, so as to complete a marking process for the resource.

According to the marking operation process shown in some embodiments of this application, on one hand, the operation is quick and convenient, and any position on the whole big world map may be marked only by dragging. On the other hand, the situation that the task point on the mark is touched by mistake is avoided. Since most of games have a lot of transfer points and task points, in a case that the place close to these points is clicked for marking, the player is easy to cause the touch by mistake, which influences the operation experience of the player. In addition, the accurate marking can also be realized without moving the map in a case of the minimal scale of the big world map: the player may directly perform the accurate marking on the complete big map without changing the map scale or manually dragging the map during the application. With the above marking operations, quick and accurate marking is performed on the map in a combination way of quick dragging and the magnifier without changing the map scale and position, and the touch by mistake is also avoided.

Figure 17:
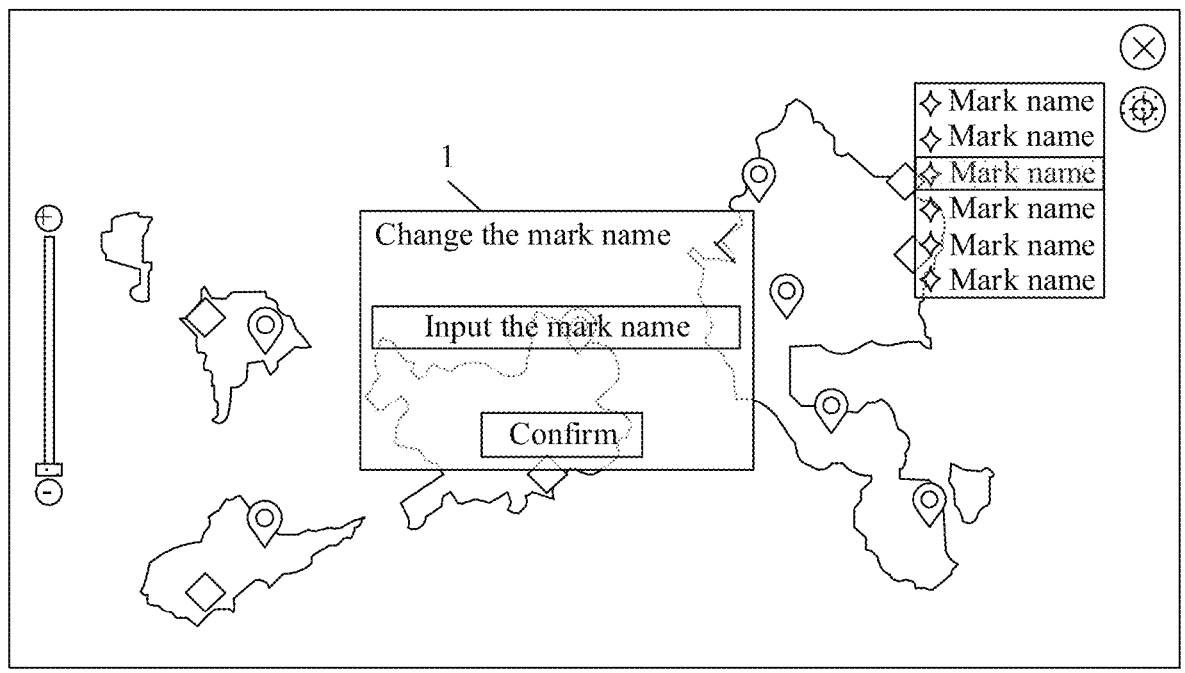
FIG. 17 is a flowchart of an edition operation for a mark name according to some embodiments.

An edition operation process for a mark name provided in the embodiment of this application is described below. Referring to FIG. 17, FIG. 17 is a flowchart of an edition operation for the mark name according to some embodiments of this application. The player presses the marking button on the big map for a long time to generate an edition instruction for the mark name, and after receiving the edition instruction, the terminal presents an edition interface (shown by Number 1 in the figure) for the mark name on an interface where the map is located. The player renames the selected mark name in the edition interface, and after clicking a confirm button, the modified mark name is displayed in the mark classification list.

Figure 18:
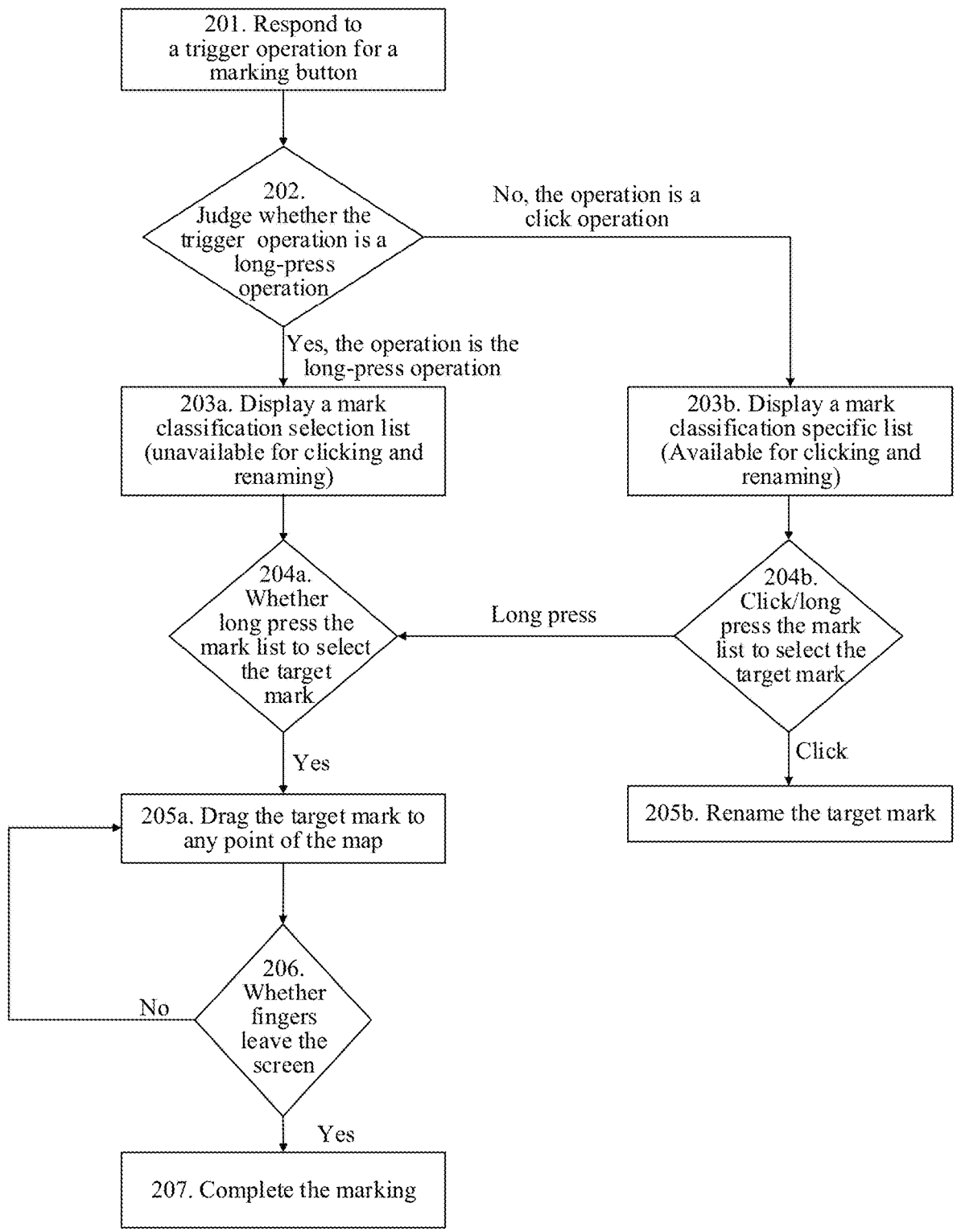
FIG. 18 is a flowchart of a position marking method according to some embodiments.

The position marking method provided in the embodiment of this application is described below. Referring to FIG. 18, FIG. 18 is a flowchart of a position marking method according to some embodiments of this application. The method includes the following operations: the terminal performs operation 201: the trigger operation of the player for the marking button is received; the terminal performs operation 202: whether the trigger operation is a long-press operation is judged, and in a case that the trigger operation is the long-press operation, operation 203a is performed: a mark classification selection list is displayed, and then various marking items in the list cannot be clicked and renamed; in a case that the trigger operation is the click operation, operation 203b is performed: the mark classification list is displayed, and then various marking items in the list can be clicked and renamed; when receiving the trigger operation of the player for the target mark in the mark classification selection list, the terminal performs operation 204a: whether the trigger operation is the long-press operation is judged, and in a case of the long-press operation, the player performs operation 205a: the target mark is dragged to any point of the map, and during the dragging, the terminal performs operation 206a: whether fingers of the user leave the screen is judged, that is, whether the release instruction for the dragging operation is received is judged, and after receiving the release instruction, the terminal performs operation 207a: marking is finished, that is, the target mark is marked at the target position in the map; and in a case that the terminal receives the release instruction, the player continues to perform operation 205a. In addition, the player may also perform operation 204b: the mark list is clicked or pressed for a long time to select the target mark, the terminal judges whether the player performs the long-press operation or click operation, in a case of long-press operation, operation 205a may be performed, and in a case of click operation, the player may continue to perform operation 205b: the target mark is renamed, that is, the renaming operation is performed on the target mark according to an operation process shown in FIG. 16.

The application of some embodiments of this application has the following effects:

1. The operation is simple: marking may be performed by quick dragging without repeated click.

2. The mark can be prevented from being touched by mistake, so that the player experience is improved: the touch by mistake caused by excessively short distance between the click position and the transfer point can be avoided completely, and the marking experience of the player can be improved; and at the same time, the redundant operation for re-closing the marking window that is popped up by clicking the map can also be avoided.

3. The integration of the maximal map and the accurate marking can be realized, so that the operation of the player is reduced: the accurate marking can be performed during the display of the maximal map, so that the operation of the player for moving the map and zooming the map can be reduced.

4. Understanding cost is relatively low: the dragging way can enable the player to play and learn quickly.

It may be understood that in some embodiments of this application, relevant data involving in user information may need the permission or consent of the user, and the collection, use and processing of relevant data need to comply with relevant laws, regulations and standards of relevant countries and regions.

An exemplary structure in which a position marking apparatus 555 in a virtual scene provided in the embodiment of this application is implemented as a software module is described below. In some embodiments, as shown in FIG. 2, software modules stored in the position marking apparatus 555 in the virtual scene of a memory 550 may include:

a display module 5551, configured to display a map of the virtual scene, the display module 5551 being further configured to display at least one virtual resource icon based on a position marking instruction for a virtual resource in the virtual scene;

a control module 5552, configured to control the target virtual resource icon to move in the map with the execution of a dragging operation based on the dragging operation for the target virtual resource icon in at least one virtual resource icon; and a marking module 5553, configured to mark the target virtual resource icon at a current position of the target virtual resource icon in the map based on a release instruction for the dragging operation.

In some embodiments, the display module is also configured to display a position marking functional item in the interface of the virtual scene; and receive the position marking instruction for the virtual resource in the virtual scene based on a first trigger operation for the position marking functional item.

In some embodiments, the display module is also configured to receive a graph drawing operation triggered based on the interface of the virtual scene; and receive the position marking instruction for the virtual resource in the virtual scene in a case that a graph drawn by the graph drawing operation is matched with a preset graph.

In some embodiments, the display module is also configured to acquire an icon display length of the virtual resource icon, and a name display length of the resource names of the virtual resource indicated by the virtual resource icon; and display the resource name of the virtual resource indicated by the virtual resource icon in a process of displaying the virtual resource icon in a case that a sum of the icon display length and the name length does not reach a length threshold.

In some embodiments, the display module is also configured to hide the resource name of the corresponding virtual resource during the display of the virtual resource icon in a case that the sum of the icon display length and the name display length reaches a width threshold, and display the resource name of the virtual resource indicated by the virtual resource icon in a form of a suspension layer in a case that the virtual resource icon is in a selected state.

In some embodiments, the display module is also configured to control the resource name of the virtual resource indicated by the virtual resource icon to be in an editable state based on the trigger operation for the virtual resource icon; and display the edited resource name based on an edition operation for the resource name in the editable state.

In some embodiments, the control module is also configured to control the target virtual resource icon in the suspension state to move in the map with the execution of the dragging operation based on the dragging operation for the target virtual resource icon in the suspension state in at least one virtual resource icon; and correspondingly, the control module is also configured to acquire operation parameters of a press operation based on the press operation for the target virtual resource icon in the at least one virtual resource icon, and the operation parameters include at least one of the following: operation duration, and pressure; and control the target virtual resource icon to be in the suspension state in a case that the operation duration reaches a duration threshold or the pressure reaches a pressure threshold.

In some embodiments, the display module is also configured to display at least one virtual resource icon in a movable state based on a position marking instruction for the virtual resource in the virtual scene;

correspondingly, in some embodiments, the control module is also configured to generate an icon duplicate in the movable state corresponding to the target virtual resource icon based on the dragging operation for the target virtual resource icon in the at least one virtual resource icon in the movable state; control the icon duplicate in the movable state to move in the map with the execution of the dragging operation.

In some embodiments, the display module is also configured to in a case that a virtual resource icon in a disabled state exists in the at least one virtual resource icon, display prompt information based on the trigger operation for the virtual resource icon in the disabled state; and the prompt information is used for prompting that the marking number of the virtual resource corresponding to the virtual resource icon in the disabled state already reaches the number threshold.

In some embodiments, the display module is also configured to acquire a real-time position of the target virtual resource icon in a process of controlling the target virtual resource icon to move in the map with the execution of the dragging operation; and synchronously display a partial enlarged interface including the real-time position.

In some embodiments, the marking module is also configured to display a target area in the interface of the virtual scene; and synchronously display the partial enlarged interface including the real-time position in the target area.

In some embodiments, the marking module is also configured to synchronously display an accompanying suspension layer associated with the target virtual resource icon, and display the partial enlarged interface including the real-time position in the accompanying suspension layer.

In some embodiments, the display module is also configured to display an icon suspension layer in the interface based on the position marking instruction for the virtual resource in the virtual scene, and display at least one virtual resource icon by adopting a target display style in the icon suspension layer; and the target display style includes at least one of a list display style and a wheel-disc display style.

In some embodiments, the control module is also configured to control to enter a multi-point marking mode for the target virtual resource icon based on a first trigger operation for the target virtual resource icon in at least one virtual resource icon;

correspondingly, in some embodiments, the marking module is also configured to control the target virtual resource icon to be in a cursor follow-up state in the multi-point marking mode; and mark the target virtual resource icon at a first position in the map based on the click operation for the first position in the map, and mark the target virtual resource icon at a second position in a case of receiving the click operation for the second position in the map after marking the target virtual resource icon at the first position.

In some embodiments, the control module is also configured to switch the display style of the target virtual resource icon from a first display style to a second display style; and correspondingly, the control module is also configured to control to exit the multi-point marking mode based on a second trigger operation for the target virtual resource icon, and switch the display style of the target virtual resource icon from the second display style to the first display style.

In some embodiments, the control module is also configured to display a dragging trajectory corresponding to the dragging operation in the virtual scene; take an area corresponding to a closed graph as a multi-point marking area in a case that the graph corresponding to the dragging trajectory on the map is the closed graph; and correspondingly, the marking module is also configured to mark the target virtual resource icon respectively at each markable resource position in an unmarked state in the multi-point marking area based on the release instruction for the dragging operation.

By using some embodiments of the disclosure, the target virtual resource icon is controlled to move in the map through the dragging operation for the target virtual resource icon displayed in the virtual scene, and after the release instruction for the dragging operation is received, the marking process for the target virtual resource icon is completed, so that the virtual resource icon can be quickly and accurately marked in a dragging way without changing the map scale and position. Compared with the way of marking by clicking the position on the map to trigger the marking pop-up window in related technologies, the number of human-computer interactions is reduced, the marking efficiency for the virtual resource icon in the map is improved, the touch by mistake is avoided, and the control efficiency of the virtual scene is improved.

Some embodiments of the disclosure provide a computer program product or a computer program, the computer program product or the computer program including a computer instruction, the computer instruction being stored in a computer-readable storage medium. A processor of a computer device reads the computer instruction from the computer-readable storage medium, and the processor executes the computer instruction to make the computer device execute the position marking method in the virtual scene in the foregoing embodiments.

Some embodiments of the disclosure provide a computer-readable storage medium storing an executable instruction, the executable instruction, when executed by a processor, may cause the processor to execute the position marking method in the virtual scene provided by some embodiments of the disclosure, such as the position marking method in the virtual scene shown in FIG. 3.

In some embodiments, the computer-readable storage medium may be a storage such as a read only memory (ROM), a random access memory (RAM), an erasable programmable read-only memory (EPROM), an electrically erasable programmable read-only memory (EEPROM), a flash memory, a magnetic storage, an optic disc, or a compact disc read-only memory (CD-ROM); and the computer-readable storage medium may also be various devices including one of or any combination of the foregoing memories.

In some embodiments, the executable instruction may be in a form of programs, software, software modules, scripts or codes, may be written in any programming language (including compiled or interpreted languages, or declarative or procedural languages), and may be deployed in any form, including being deployed as independent programs or being deployed as modules, components, subroutines or other units suitable for use in a computing environment.

As an example, the executable instruction may, but not necessarily correspond to a file in a file system, may be stored in a part of the file for saving other programs or data, for example, stored in one or more scripts in a hypertext markup language (HTML) document, stored in a single file specifically used for the program of interest, or stored in a plurality of collaborative files (such as files storing one or more modules, a submodule, or a code part).

As an example, the executable instruction may be deployed for execution on a computing device, or on a plurality of computing devices located in a same place, or on a plurality of computing devices distributed in a plurality of places and interconnected through a communication network.

In conclusion, according to some embodiments of the disclosure, quick and accurate marking is performed on the map in a combination way of quick dragging and partial enlargement without changing the map scale and position in the virtual scene, and the touch by mistake is also avoided.

The foregoing descriptions are merely embodiments of the disclosure, and are not intended to limit the protection scope of the disclosure. Any modification, equivalent replacement, or improvement made without departing from the spirit and principle of the disclosure shall fall within the protection scope of the disclosure.

What is claimed is:

1. A position marking method in a virtual game scene, performed by an electronic device, and comprising:
    displaying a map corresponding to an area of the virtual game scene, wherein the map is displayed at a first zoom level;
    controlling, in response to a moving operation on a marker list on the virtual game scene, a target marker to move to a first position on the map;
    displaying, at a predetermined distance from the first position, a zoom-in view of a first area based on the first position of the target marker on the map,
        wherein the first area is a magnified view of a surrounding area of the first position on the map,
        wherein the first area has a second zoom level greater than the first zoom level, and
        wherein, when the zoom-in view of the first area is displayed, a remaining area of the map is unchanged and displayed at the first zoom level; and
    marking, in response to a marking instruction, the first position on the map based on a final position of the target marker on the zoom-in view of the first area.

2. The method according to claim 1, wherein the zoom-in view of the first area is dynamically displayed relative to the first position of the target marker on the map.

3. The method according to claim 1, wherein the moving operation is a dragging operation for the target marker, and the marking instruction is a release operation of the dragging operation.

4. The method according to claim 1, further comprising: displaying a plurality of target markers.

5. The method according to claim 4, further comprising: selecting one or more target markers from the plurality of target markers based on a selection operation.

6. The method according to claim 5, wherein the selection operation is a dragging operation associated with the target marker.

7. The method according to claim 1, further comprising: displaying a name of the target marker along with a target marking icon.

8. The method according to claim 7, further comprising: renaming the name of the target marker based on a renaming operation.

9. The method according to claim 3, wherein the dragging operation starts with a pressing operation with a pressing duration passing a duration threshold.

10. An apparatus comprising:
at least one memory configured to store computer program code; and
at least one processor configured to access the at least one memory and operate according to the computer program code, the computer program code including:
  map displaying code configured to cause at least one processor to display a map corresponding to an area of a virtual game scene, wherein the map is displayed at a first zoom level;
  marker controlling code configured to cause at least one processor to control, in response to a moving operation on a marker list on the virtual game scene, a target marker to move to a first position on the map;
  marker displaying code configured to cause at least one processor to display, at a predetermined distance from the first position, a zoom-in view of a first area based on the first position of the target marker on the map,
wherein the first area is a magnified view of a surrounding area of the first position on the map,
wherein the first area has a second zoom level greater than the first zoom level, and
wherein, when the zoom-in view of the first area is displayed, a remaining area of the map is unchanged and displayed at the first zoom level; and
  marking code configured to cause at least one processor to mark, in response to a marking instruction, the first position on the map based on a final position of a target marking icon on the zoom-in view of the first area.

11. The apparatus according to claim 10, wherein the zoom-in view of the first area is dynamically displayed relative to the first position of the target marker on the map.

12. The apparatus according to claim 10, wherein the moving operation is a dragging operation for the target marker, and the marking instruction is a release operation of the dragging operation.

13. The apparatus according to claim 10, wherein the marker displaying code is further configured to display a plurality of target markers.

14. The apparatus according to claim 13, further comprising:
  selecting code configured to cause at least one processor to select one or more target markers from the plurality of target markers based on a selection operation.

15. The apparatus according to claim 14, wherein the selection operation is a dragging operation associated with the target marker.

16. The apparatus according to claim 10, wherein the marker displaying code is further configured to display a name of the target marker along with the target marking icon.

17. The apparatus according to claim 12, wherein the dragging operation starts with a pressing operation with a pressing duration passing a duration threshold.

18. A non-transitory computer readable medium storing computer program code for position marking in a virtual game scene, the computer program code configured to cause at least one processor to:
  display a map corresponding to an area of the virtual game scene, wherein the map is displayed at a first zoom level;
  controlling, in response to a moving operation on a marker list on the virtual game scene, a target marker to move to a first position on the map;
  display, at a predetermined distance from the first position, a zoom-in view of a first area based on the first position of the target marker on the map,
    wherein the first area is a magnified view of a surrounding area of the first position on the map,
    wherein the first area has a second zoom level greater than the first zoom level, and
    wherein, when the zoom-in view of the first area is displayed, a remaining area of the map is unchanged and displayed at the first zoom level; and
  mark, in response to a marking instruction, the first position on the map based on a final position of the target marker on the zoom-in view of the first area.

* * * * *